United States Patent
Ulrich et al.

(12)
(10) Patent No.: US 6,239,795 B1
(45) Date of Patent: *May 29, 2001

(54) PATTERN AND COLOR ABSTRACTION IN A GRAPHICAL USER INTERFACE

(75) Inventors: Robert R. Ulrich, Mountain View; Robert G. Johnston, Jr., Cupertino, both of CA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,947

(22) Filed: May 26, 1999

Related U.S. Application Data

(63) Continuation of application No. 08/797,451, filed on Feb. 7, 1997, now Pat. No. 5,963,206, which is a continuation of application No. 08/242,963, filed on May 16, 1994, now abandoned.

(51) Int. Cl.[7] ..................................................... G06F 15/00
(52) U.S. Cl. ............................................................ 345/333
(58) Field of Search ..................................... 345/340, 342, 345/343, 346, 348, 141, 113, 333

(56) References Cited

U.S. PATENT DOCUMENTS

| | | | | |
|---|---|---|---|---|
| 5,900,874 | * | 5/1999 | Shrader et al. | 345/348 |
| 5,940,078 | * | 8/1999 | Nagarajayya et al. | 345/348 |
| 5,963,206 | * | 10/1999 | Ulrich et al. | 345/342 |

* cited by examiner

*Primary Examiner*—Phu K. Nguyen
(74) *Attorney, Agent, or Firm*—Burns, Doane, Swecker & Mathis, LLP

(57) ABSTRACT

Systems and method for providing a user with increased flexibility and control over the appearance and behavior of objects on a user interface. Sets of objects can be grouped into themes to provide a user with a distinct overall impression of the interface. Themes can be switched dynamically by switching pointers to drawing procedures or switching data being applied to these procedures. To buffer applications from the switchable nature of graphical user interfaces, colors and patterns used to implement the interface objects are abstracted from the interface by, for example, pattern look-up tables.

15 Claims, 14 Drawing Sheets

- TOP LEFT CORNER
- TOP RIGHT CORNER
- BOTTOM RIGHT CORNER
- BOTTOM RIGHT CORNER W/GROW
- BOTTOM LEFT CORNER
- CLOSE BOX
- ZOOM BOX
- TITLE BAR TEXTURE LEFT EDGE
- TITLE BAR TEXTURE
- TITLE BAR PLAIN
- TITLE BAR INACTIVE

- TOP LEFT CORNER, INACTIVE
- TOP RIGHT CORNER, INACTIVE
- BOTTOM RIGHT CORNER, INACTIVE
- BOTTOM RIGHT CORNER W/GROW, INACTIVE
- BOTTOM LEFT CORNER, INACTIVE
- CLOSE BOX, PRESSED
- ZOOM BOX, PRESSED
- TITLE BAR TEXTURE RIGHT EDGE
- BOTTOM DRAG BORDER
- VERTICAL DRAG BORDER
- BOTTOM DRAG BORDER, INACTIVE
- VERTICAL DRAG BORDER, INACTIVE

| FROM | | Q1 | Q2 | Q3 | Q4 | Q5 | Q6 | Q7 | Q8 | Q9 |
|---|---|---|---|---|---|---|---|---|---|---|
| | Q1 |  | T1 | T3 | T5 |  |  | T7 |  |  |
| | Q2 | T2 |  |  |  |  |  |  |  |  |
| | Q3 | T4 |  |  |  |  |  |  |  |  |
| | Q4 | T6 |  |  |  | T9 | T11 | T13 |  |  |
| | Q5 |  |  |  | T10 |  |  |  |  |  |
| | Q6 |  |  |  | T12 |  |  |  |  |  |
| | Q7 | T8 |  |  | T14 |  |  |  | T15 | T17 |
| | Q8 |  |  |  |  |  |  | T16 |  |  |
| | Q9 |  |  |  |  |  |  | T18 |  |  |

FIG. 7

PATTERN AND COLOR ABSTRACTION IN A GRAPHICAL USER INTERFACE

RELATED APPLICATIONS

This application is a continuation of application Ser. No. 08/797,451 filed on Feb. 7, 1997 and now U.S. Pat. No. 5,963,206, which is a continuation of application Ser. No. 08/242,963 filed May 16, 1994 (now abandoned).

This application is related to U.S. patent application Ser. No. 08/782,829 filed Jan. 13, 1997 entitled "A System and Method for Customizing Appearance and Behavior of Graphical User Interfaces", which is a continuation of application Ser. No. 08/243,327, filed May 16, 1994 (now abandoned), and U.S. patent application Ser. No. 08/243,268, filed May 16, 1994 entitled "Switching Between Appearance/Behavior Themes in Graphical User Interfaces".

BACKGROUND

The present invention relates generally to graphical user interfaces for computer systems. More particularly, the present invention relates to systems and methods for interfacing applications and operating systems which provide for flexible customization of graphical user interfaces.

The evolution of the computer industry is unparalleled in its rate of growth and complexity. Personal computers, for example, which began as little more than feeble calculators with limited memory, tape-driven input and monochrome displays are now able to tackle almost any data processing task. While this meteoric increase in power was almost sufficient to satisfy the demand of application programmers and end users alike, the corresponding increase in complexity created an ease-of-use problem which the industry was somewhat slower in solving. Thus, designers were faced with a new challenge: to harness this computing power in a form usable by even those with relatively little computer training to smooth the transition of other industries into a computer-based information paradigm.

As a result, in the early to mid-1980's many new I/O philosophies, such as "user friendly", "WYSIWYG" and "menu driven" came to the forefront of the industry. These concepts are particularly applicable to microcomputers, also known as personal computers, which are intended to appeal to a broad audience of computer users, including those who previously feared and mistrusted computers. An important aspect of computers which employ these concepts was, and continues to be, the interface which allows the user to input commands and data and receive results, which is commonly referred to as a graphical user interface (GUI).

One type of GUI display is based on a visual metaphor which uses a monitor screen as a work surface called a "desktop" where documents are presented in relocatable regions termed "windows". The user interacts with the computer by, for example, moving objects on the desktop, choosing commands from menus, and manipulating window controls, such as checkboxes and scroll bars. An exemplary desktop screen is reproduced as FIG. 1.

The success of this type of interface is evident from the number of companies which have emulated the desktop environment. Even successful concepts, however, must continually be improved in order to keep pace with the rapid growth in this industry. The advent of multimedia, especially CD-ROM devices, has provided vast quantities of secondary storage which have been used to provide video capabilities, e.g., live animation and video clips, as regular components of application displays. With these new resources at their disposal, application designers, and others, desire more and more control over the appearance of the display, including the desktop environment and, in particular, objects on the desktop.

Windows are one example of desktop objects which can be virtually any size, shape, or color. Some standard types of windows are commonly predefined for the interface including, for example, a document window and a dialog box. One example of a standard for a document window is illustrated in FIG. 2A. Each document window which conforms to this standard has a title bar with a title drawn in a system-defined font and color. Active document windows can also have controls as illustrated in FIG. 2A, for example, a close box, a zoom box, a size box, and scroll bars. These standard types of windows (as well as other standard desktop objects) are beyond the reach of users who wish to alter the appearance and/or behavior.

Accordingly, application developers can define their own nonstandard window types as desired, although each nonstandard window requires a relatively large block of memory. Further, even these nonstandard window types provide only limited flexibility and control over the appearance and behavior of desktop objects in that they are application-specific and do not present a consistent interface across all applications, i.e., if three different applications are running, each might present a different "look" on desktop. Once again, the user has no control over the appearance and/or behavior of these nonstandard window objects.

Since the window format, including the appearance, behavior and function of standard windows and window parts, is known a priori to applications which were designed for such conventional systems, these applications are written to take advantage of such knowledge. As seen in FIG. 3, suppose, for example that an application 10 desires to draw a rectangle in the color of the title bar (beige, in this example) in a window (not shown on the desktop). The application assumes knowledge of the color of the title bar when using predefined standard window definitions 25 and, if this application uses window definitions created by the application itself, the application will have actual knowledge of colors defined by those windows. Accordingly, the application will simply send a command to the interface instructing that a beige rectangle be drawn in the window.

Each standard window, as well as any nonstandard window, conventionally has a corresponding window definition 25. The window definition 25 includes all of the data necessary to define the window. Looking at the active window illustrated in FIG. 1, data included in the window definition 25 for such an active window would include, for example, the size of the window, the relative location of the close box and zoom box in the upper lefthand and righthand corners, respectively, the number of parallel lines and their locations relative to the close box and the zoom box, and the upper boundary of the window and all of the other defining features of that particular window. The application supplies the variable parameters such as the location of the window on the desktop interface and, perhaps, the colors and/or fonts to be used for the text and/or figures in the window. As one can imagine, the window definitions can include a large amount of data and, therefore, can require a large amount of memory for each definition.

In addition to the amount of memory used to create non-standard window definitions, another problem with this conventional method of providing variety of appearance in the graphical user interface is the lack of a consistent appearance between objects drawn on the desktop by different applications. With multitasking i.e., multiple applications running simultaneously on a desktop, it is now common for users to simultaneously run multiple applications each of which has its own window on the desktop. However, if each application uses its own combination of standard and non-standard window definitions that result in each application having its own appearance and behavior. The dissimilarity in appearance and behavior between applications can be annoying and confusing to a user.

Accordingly, it would be desirable to allow application designers and application users to have additional flexibility and greater control over the appearance and behavior of desktop objects and individual controls for those objects.

SUMMARY

According to exemplary embodiments of the present invention, an improved visual appearance can be provided to GUIs by providing an appearance management layer that gives users (both application developers and end users) the ability to customize the appearance and behavior of the desktop. This layer can be provided between all of the clients, e.g., applications, the end user, definition procedures, and the graphic subsystem which actually writes to the display. In this way, a level of abstraction is provided between the client and the system so that customization can be facilitated without requiring the client to have a detailed knowledge of the interface environment, which may be constantly changing.

Themes can be created which include sets of desktop objects that are designed, both in their visual appearance and behavior, to project an overall impression to the area. The user can switch between themes, even at runtime, to change this overall impression.

BRIEF DESCRIPTION OF THE DRAWINGS

The foregoing, and other, objects, features and advantages of the present invention will be more readily understood by those skilled in the art upon reading the following detailed description in conjunction with the drawings in which:

FIG. 5 illustrates a set of glyphs which can be used to create a document window for a particular theme according to an exemplary embodiment of the present invention;

FIG. 7 is an exemplary matrix used to describe behavior transitions according to exemplary embodiments in the present invention;

DETAILED DESCRIPTION

The present invention is described herein by way of exemplary, illustrative embodiments, some of which use the Macintosh® computer system as a reference for explaining the present invention. However, those skilled in the art will readily appreciate that systems and methods according to the present invention can be applied to any type of display system having a user interface. Further, while window objects are used to illustrate how exemplary embodiments of the present invention affect the appearance and behavior of desktop objects in general, those skilled in the art will recognize that the present invention can be used to control the appearance and behavior of any desktop object including, for example, icons, menus, lists, control elements, cursors, menu bars, etc.

Figure 1:
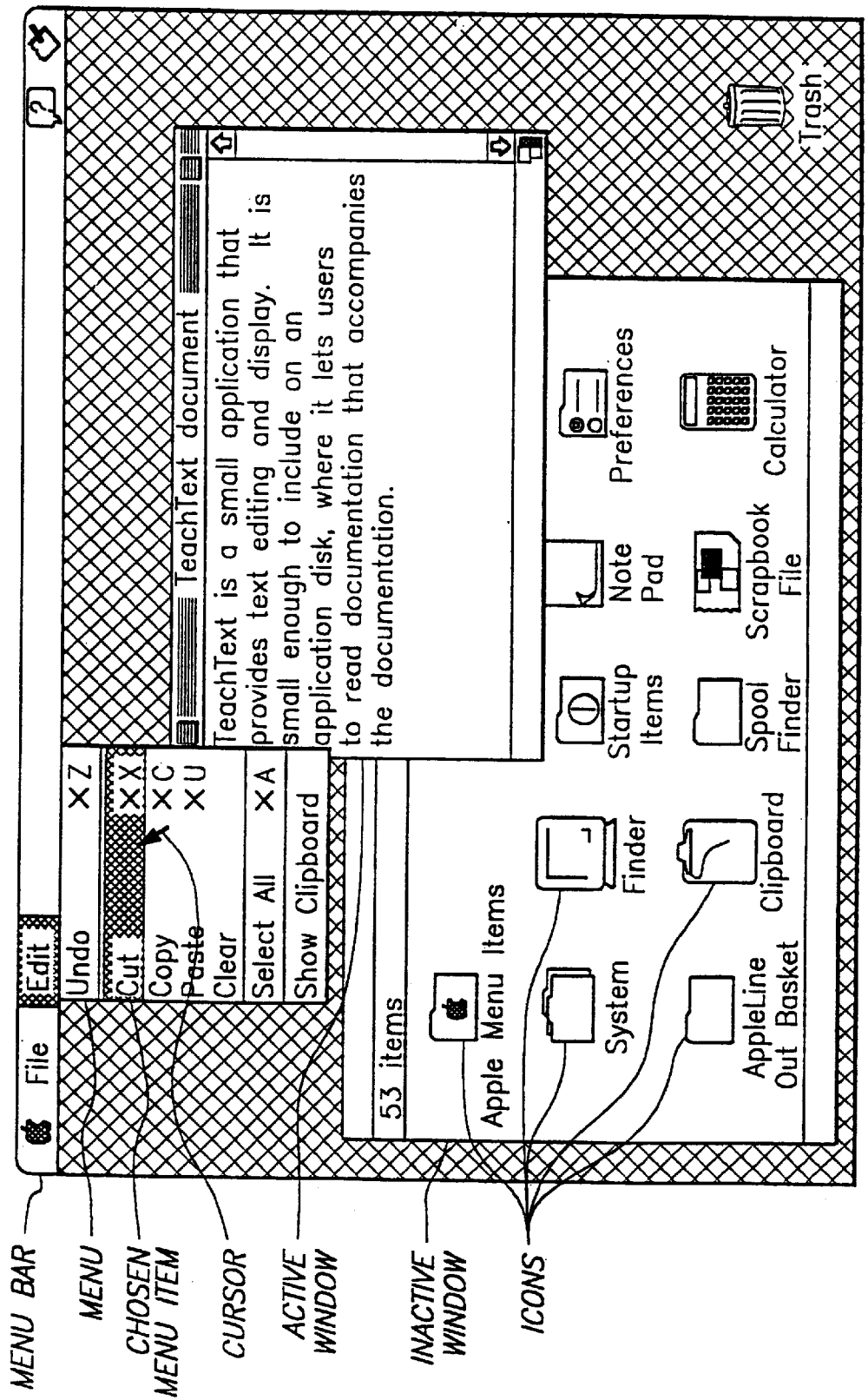
FIG. 1 shows a conventional desktop screen.
Figure 2A:
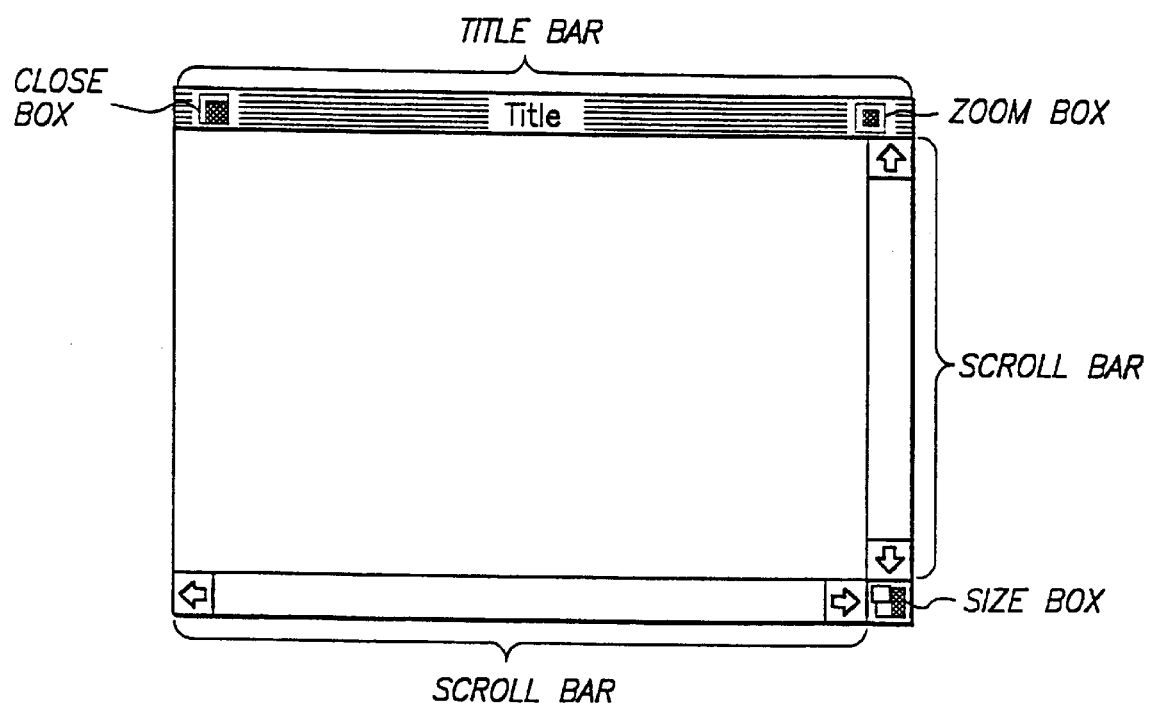
FIG. 2A shows a conventional document window.

Windows can be characterized in a variety of ways. For example, a window can be characterized by the shape, size and color of the window as well as by the location, size, shape and color of each of its component parts, e.g., those parts identified in FIG. 2A. These attributes of a window and window parts are categorized herein as a window's appearance attributes. The window and its parts also have associated therewith one of more functions which are invoked when a user provides an associated input, e.g., clicking on a close button or box causes the window to close. These are termed functional attributes.

A third category of attributes also exists for some windows and window parts. These windows and window parts exhibit a behavior when acted on by a user which is distinct from the underlying function of these objects, i.e., when a user clicks on a close button using a mouse, the button becomes shaded in such a way that it appears depressed prior to the window actually closing.

Of these three attribute categories, namely appearance, behavior and function, exemplary embodiments of the present invention provide users (the term users as applied throughout this document refers to both end users of applications, application developers and other individuals who use or invoke operating systems) with the capability to alter the appearance and behavior of object and objects parts, but preferably not the underlying function thereof. It will be understood by those skilled in the art that the principles described herein are equally applicable to systems and methods in which the functional attributes can also be varied by users. However, standardization of system functionality provides certain advantages so that exemplary embodiments of the present invention separate functional manipulation from manipulation of the other attributes.

Figure 2B:
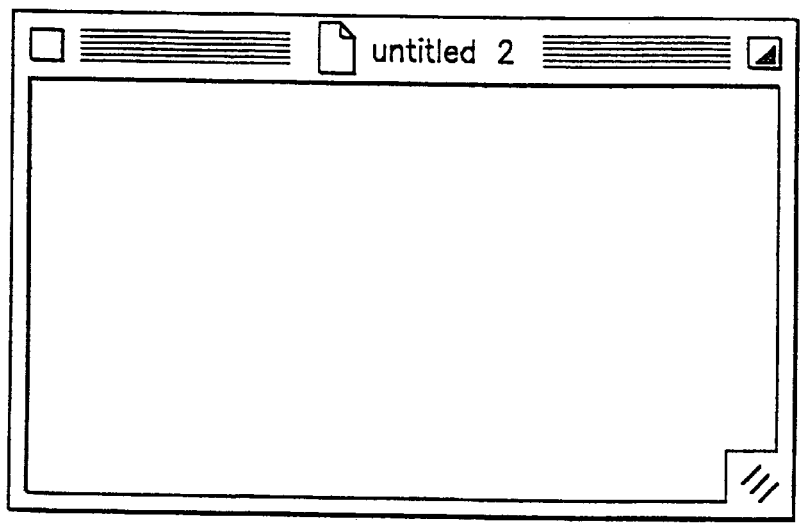
FIG. 2B illustrates a document window according to an exemplary embodiment of the present invention.
Figure 2C:
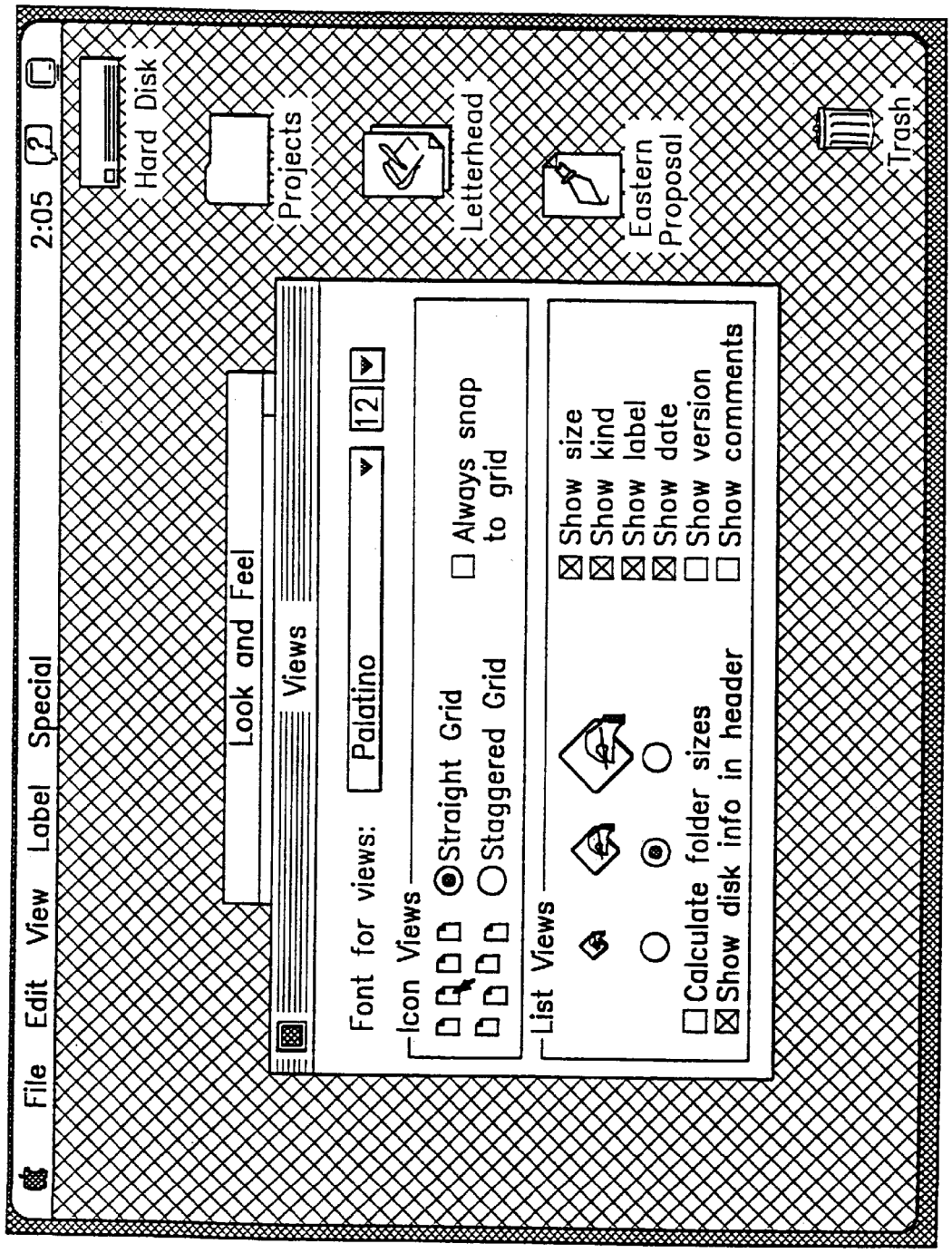
FIG. 2C illustrates a conventional user interface.
Figure 2D:
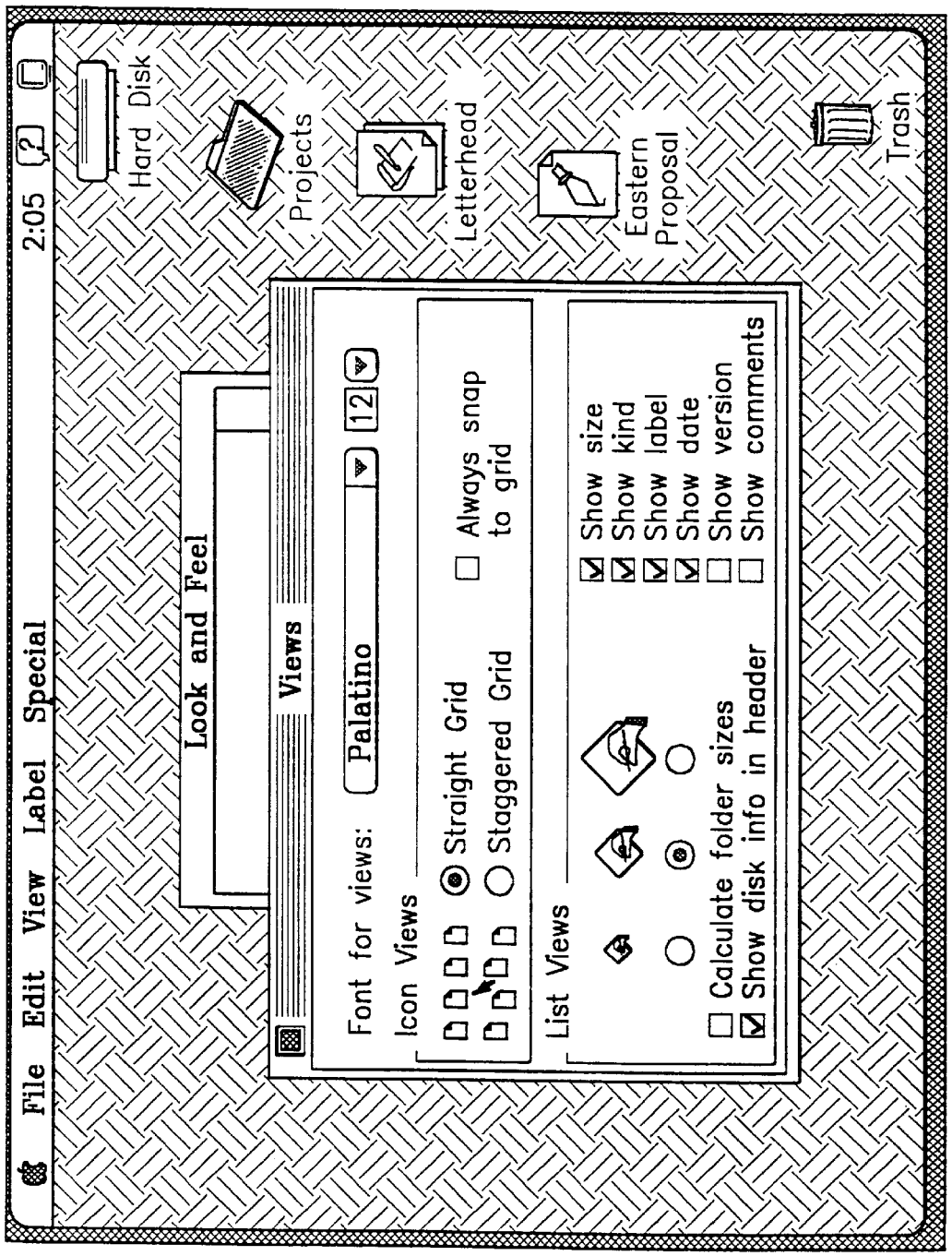
FIG. 2D illustrates the user interface of FIG. 2C operating under a theme according to an exemplary embodiment of the present invention.
Figure 2E:
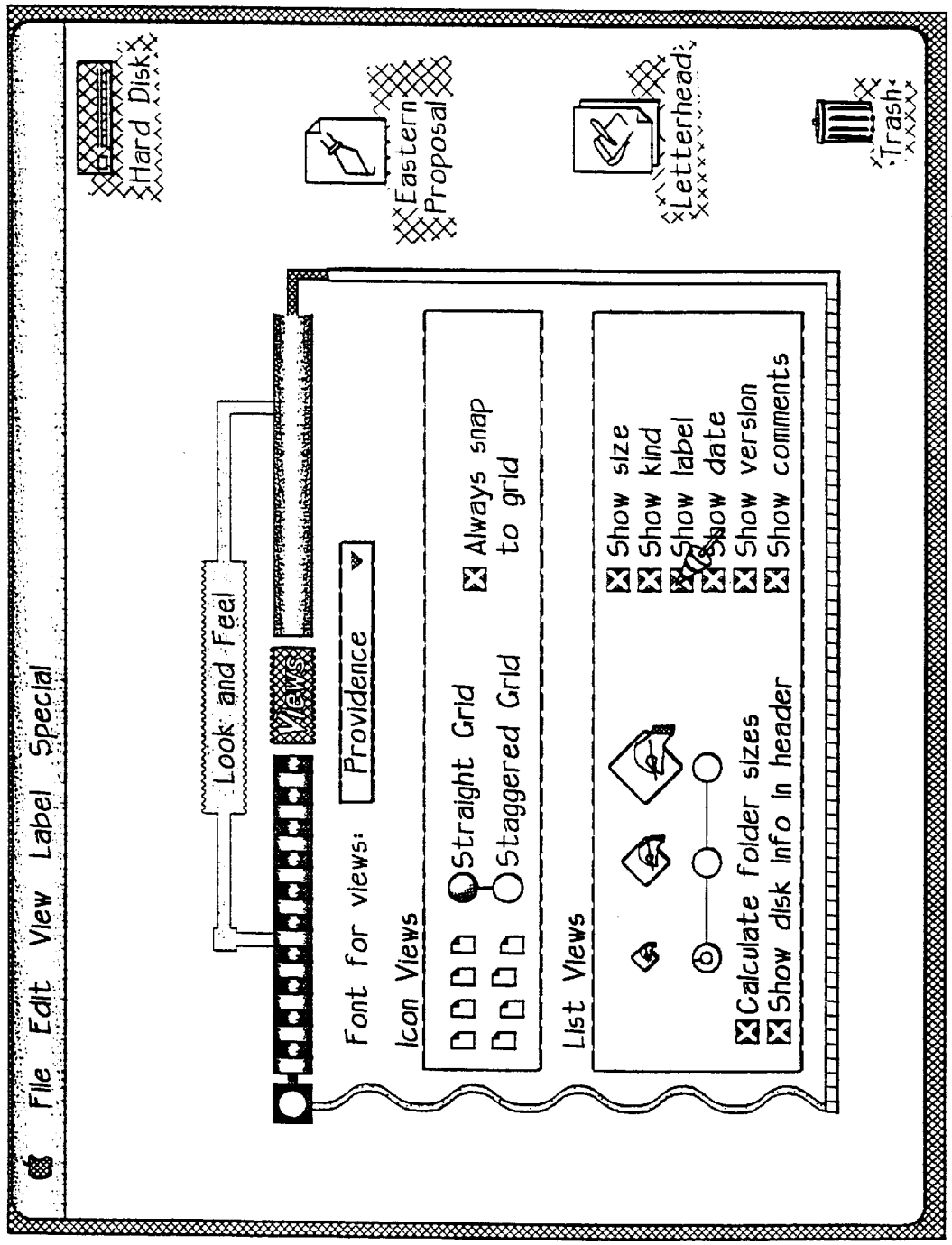
FIG. 2E illustrates the user interface of FIG. 2C operating under a second theme according to another exemplary embodiment of the present invention.
Figure 3:
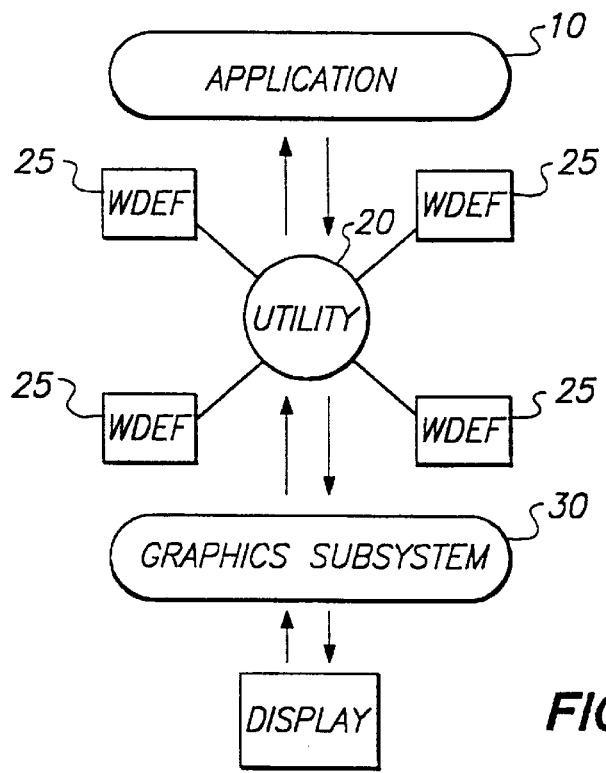
FIG. 3 illustrates a functional overview of a system for customizing a user interface according to an exemplary embodiment of the present invention.

Given all of the graphical and audio artistry available today for GUIs, one can easily imagine the wide variety of desktop "looks" which can be developed once the system's control over the appearance and behavior of interface objects is relaxed. Comparison of the conventional user interface screen shown in FIG. 2C with user interface screens using different themes shown in FIG. 2D and 2E is an excellent starting point toward understanding the powerful capabilities for appearance and behavior change in user interfaces according to the present invention. Note, for example, the difference in appearance between the "Views" title bar in FIG. 2C as opposed to those of FIG. 2D and 2E.

Figure 4:
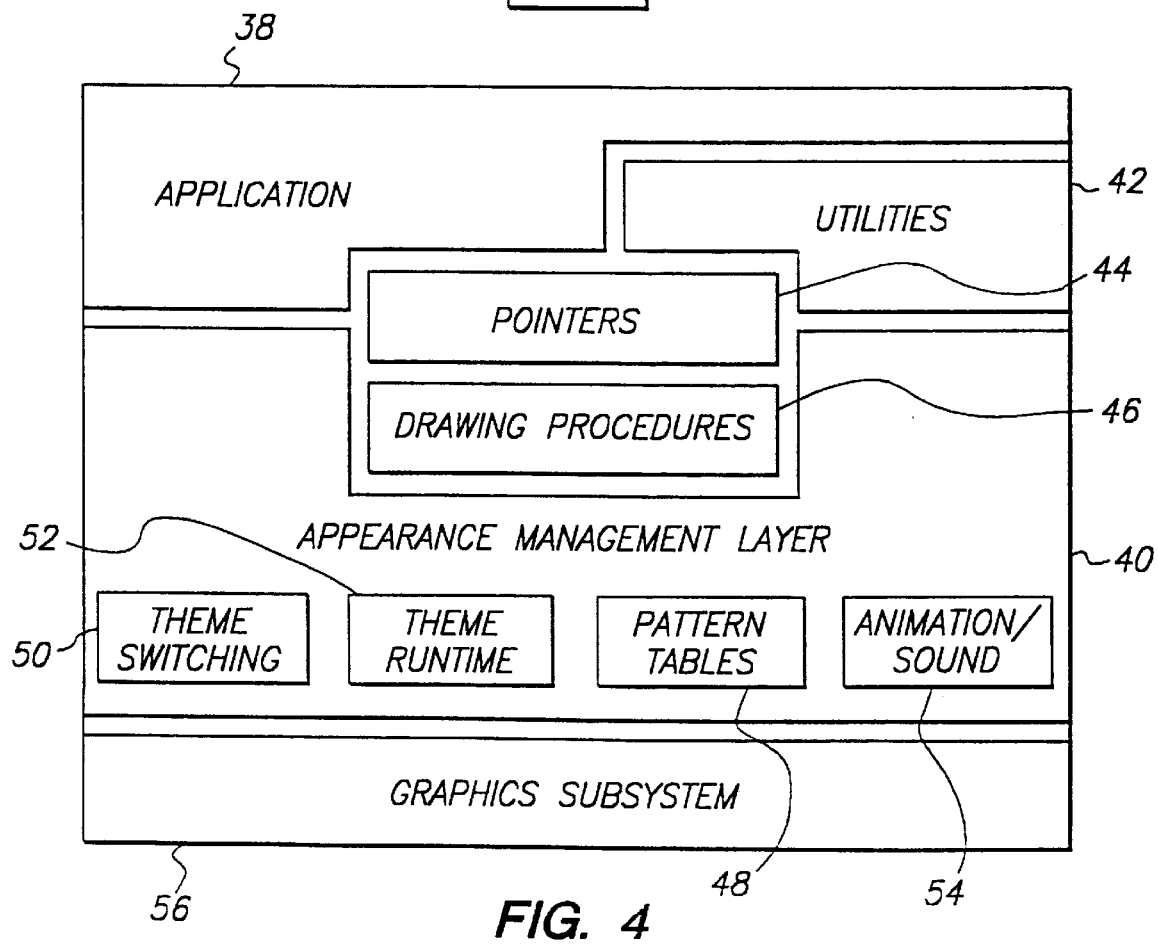
FIG. 4 illustrates an exemplary architecture showing theme and application interaction according to an exemplary embodiment of the present invention.

An overview which summarizes how these types of customized user interfaces can be provided in a consistent and switchable manner begins with a discussion of FIG. 4. As shown, the application 38 interacts with the appearance management layer 40 through three paths: directly, through utilities 42 (e.g., Toolbox Managers), and through drawing procedures 46 which provide the fundamental instructions (e.g., defprocs) for drawing objects on the interface. The phrase "drawing procedure" as it is used in this document refers to pieces of code which are responsible for drawing interface objects and which define the shape of those objects, e.g., window definitions.

Note that the application does not access the drawing procedures directly, but does so through a table of pointers 44 maintained by the appearance management layer and utilities. Switchable pointers 44 and drawing procedures 46 provide the basic building blocks which allow the geometry of each interface object as well as the behavior of each object's controls to be manipulated in a consistent and replaceable fashion. By switching the pointers 44 to the drawing procedures 46, or by switching the data used by the procedures 46, the appearance and behavior of the interface can be readily changed.

To provide the flexibility afforded by the present invention, applications no longer need to have a priori knowledge of the patterns or colors used for each object and its controls. Therefore, a pattern table 48 is used to look up this information and serves to abstract the color and/or pattern of the object from its other attributes. According to certain exemplary embodiments, drawing primitives which allow "paint-by-number" interface drawing are sent by the client to the appearance management layer. In other words, the application can simply command the appearance management layer 40 to draw an object using an index which identifies the pattern and/or color of that object, so that the visual geometry is abstracted from the colorspace and the application need not know which particular geometries and/or colors are currently being implemented. According to other exemplary embodiments, the pattern table 48 acts as a pattern/color database and returns the relevant pattern information to the client. The client then instructs the graphic subsystem 56 to render the appropriate pattern.

In order to provide the functionality to switch between themes, the theme switching 50 and run time support 52 control interaction of the appearance management layer and the theme. As used herein, the terms "theme" and "themes" refer to coordinated designs of interface objects and object parts that create a distinct visual appearance on the display. These routines provide mechanisms for loading and unloading themes and obtaining theme attributes. Various routines are also provided to support animation and sounds and handling desktop patterns and screen saver modules in the interface as shown generally by block 54.

Switchable Pointers and Drawing Procedures

Many of the objects which are drawn in the user interface are created by small, modular pieces of code in the system which are dedicated to a specific purpose, e.g., drawing window frames. These pieces of code, called drawing procedures or definition procedures (defprocs) herein, are designed for switching at run time to enable dynamic system appearance and behavior. While the procedure and mechanism for switching between themes is described in more detail below, this section focuses on exemplary ways in which these procedures are designed to provide a switchable routine environment.

The appearance management layer 40 is responsible for orchestrating various changes which allow switching of the user interface's appearance and behavior. Two exemplary ways in which the drawing procedures can be switched will now be described here.

According to certain exemplary embodiments, all of the utilities which support switchable drawing procedures will be called to "disconnect" all of the drawing procedures for each of the interface objects supported by that particular utility. In essence, this amounts to sending a dispose message to the drawing procedure for each and every utility object element currently in existence. The utility then is called to swap pointers 44 to the drawing procedures. For example, if window drawing procedure A is being replaced by window drawing procedure B, the window drawing utility will be asked to replace all of its references to procedure A with references to procedure B. This process will occur for each drawing procedure that is switched out. Lastly, every drawing procedure for every utility interface element should be sent an initialize message and the display will be completely redrawn.

According to other exemplary embodiments of the present invention, these drawing procedures can be data driven so as to allow each procedure to be able to support a wide variety of appearances and behaviors without modifying the code of the procedure itself. In this way themes can be switched without requiring that the drawing procedure code be switched. Each theme provides its own data structures which are supplied to the parametric drawing procedure. These exemplary embodiments will now be described in more detail.

According to certain exemplary embodiments of the present invention, system-provided drawing procedures map directly from existing procedures to provide compatibility with existing systems. For example, each individual drawing procedure will correspond to a conventional procedure (e.g., WDEF0, WDEF1, CDEF0, CDEF1). This mapping can be accomplished, for example, by the exemplary mapping procedure illustrated below in pseudocode form. This exemplary procedure can handle loading both conventional drawing procedures as well as the new drawing procedures.

```
OSErr MapDefprocReference(ResType defprocType, SInt16 defprocID,
                Handle *defprocHandle, SOMObject **ido)
{
    OSErr result;
    //
    // First load the defprocType, defprocID resource
    //
    *defprocHandle = GetResource(defprocType,defprocID);
    //
    // If the resource came from the system, this identifies it as a stub
    //    and so get the corresponding ido pointer.
```

```
//
if (the Handle is a System Resource)
{
    result = GetSystemIDO(defprocType,defprocID,ido);
}
else
//
// If the resource didn't come from the system, assume it's a
// custom resource deproc and return a NULL ido pointer.
//
{
    result = noErr;
    *ido = NULL;
}
}
```

The first step, as seen above, is to determine the resource ID of the procedure being called. This will load either an old style procedure located in a resource chain or a stub resource from the system file. Stub resources are modules which, when invoked, decode a conventional procedure's message and call the corresponding new drawing procedure based on the decoded message. Thus, when a utility creates a new interface object using a drawing procedure it will also load an appropriate stub resource and store its value in a procedure handle field of the object's data structure. Since the utilities can switch the drawing procedure that they call, the ability to dynamically change the set of drawing procedures which create the interface objects is now available.

According to other exemplary embodiments of the present invention, the drawing procedures can be parametric in nature so that they need not be switched every time that a theme is changed. Instead, the data supplied to these procedures is changed with the theme. A discussion of these exemplary embodiments begins with a description of the data used to drive these procedures.

The data structures which are used to drive the structural procedures according to this exemplary embodiment of the present invention can be categorized as interface geometry elements data and interface behavior elements data. An object geometry is specified by a list of arbitrary geometry objects that are linked together with a simple rule based view system. Each of the geometry objects are arbitrary in size and shape and may repeat in either a horizontal or vertical direction. Drawing procedures such as window drawing procedures (e.g., WDEFs), and menu drawing procedures (e.g., MDEFs), can use these geometry resources to calculate and draw the structure region of an interface object, e.g., a window or a menu.

TABLE A

| Opcodes | Specify edges of glyphs in object by offsets. |
|---|---|
| Glyph List | Points to data structure for each glyph. |
| Geometry Part List | Combines glyphs with boundaries. |
| Existence State Table | All boundaries and geometry parts indicate when they exist in the object. |

The resources that define this geometry model can be broken into four parts as seen in Table A, above. First, there are a list of operation codes which place horizontal and vertical boundaries that will be used to specify the edges of glyphs in the object. Each boundary can be placed relative to a reference, which is either part of a parent shape (e.g., a rectangle that defines a window's, or other object's, workspace) or a previously defined boundary. The offset can either be a constant or some other value recognized by the system, such as the height of a window's title. As each boundary is placed, a limit can be specified such that the new boundary will fall between the limit boundary and the reference boundary. Limit boundaries allow geometry elements to disappear when the parent shape becomes too small to support them.

Second, a geometry resource can also contain a list of glyphs. Each glyph can be derived from a pattern of pixels, a bitmapped image or an icon. Moreover, each glyph can also specify on which corner it is anchored to allow it to be drawn in the correct direction.

Third, there can be a list of geometry parts each of which combine one of the glyphs with two horizontal and two vertical boundaries. For each type of interface object, there may be both required and optional parts. For example, a window may be required to have a close box or button part but may also include many optional parts that are used to enhance the appearance of the window.

Finally, all boundaries and parts can specify in which states they exist. For example, a close box part and perhaps one or more of its boundaries might not exist in the inactive state of a window. This yspecification reduces the amount of computation and drawing that is done in any particular state. Each interface element has a predefined set of states that may be used when traversing the geometry resources. Another use for this mechanism is to change the appearance of a part in a special state of the object. For example, to change the appearance of a window's bottom edge when the glyph is deactivated, two bottom edge parts can be defined that use different glyphs. One of these parts might exist only when the window is active, the other when the window is inactive. An exemplary table of glyphs appended as FIG. 5 illustrate a set of glyphs which can be used to render a document window in an exemplary theme as shown in FIG. 2B. The horizontal and vertical boundaries are constructed so as to locate all of these glyphs around the content shape of the window to produce the desired look for this theme.

The second category of data structures used in the data driven structural procedure relate to interface objects' behaviors. Each behavior is associated with transitions between different states or values of controls in the interface and can be expressed by changes in visual or audio output that correspond to these transitions.

Data driven drawing procedures can use a common mechanism that implements state tables. These state tables contain bitmaps or glyphs for each state of the control represented thereby as well as information about transitions from one state to another. Each transition may contain one or more of, for example, an animation sequence, a sound or a routine to implement a custom transition, e.g., an algorithmic display or any other type of transitional effect. By defining state diagrams for each object and object part of the user interface, a template can be created that allows a theme designer to place customized glyphs for each state of the control and also to customize the transitions between states of the control as desired. An exemplary state diagram is shown as FIG. 6 which provides an example of the possible states and most common state transitions for a checkbox control of a window object.

Figure 6:
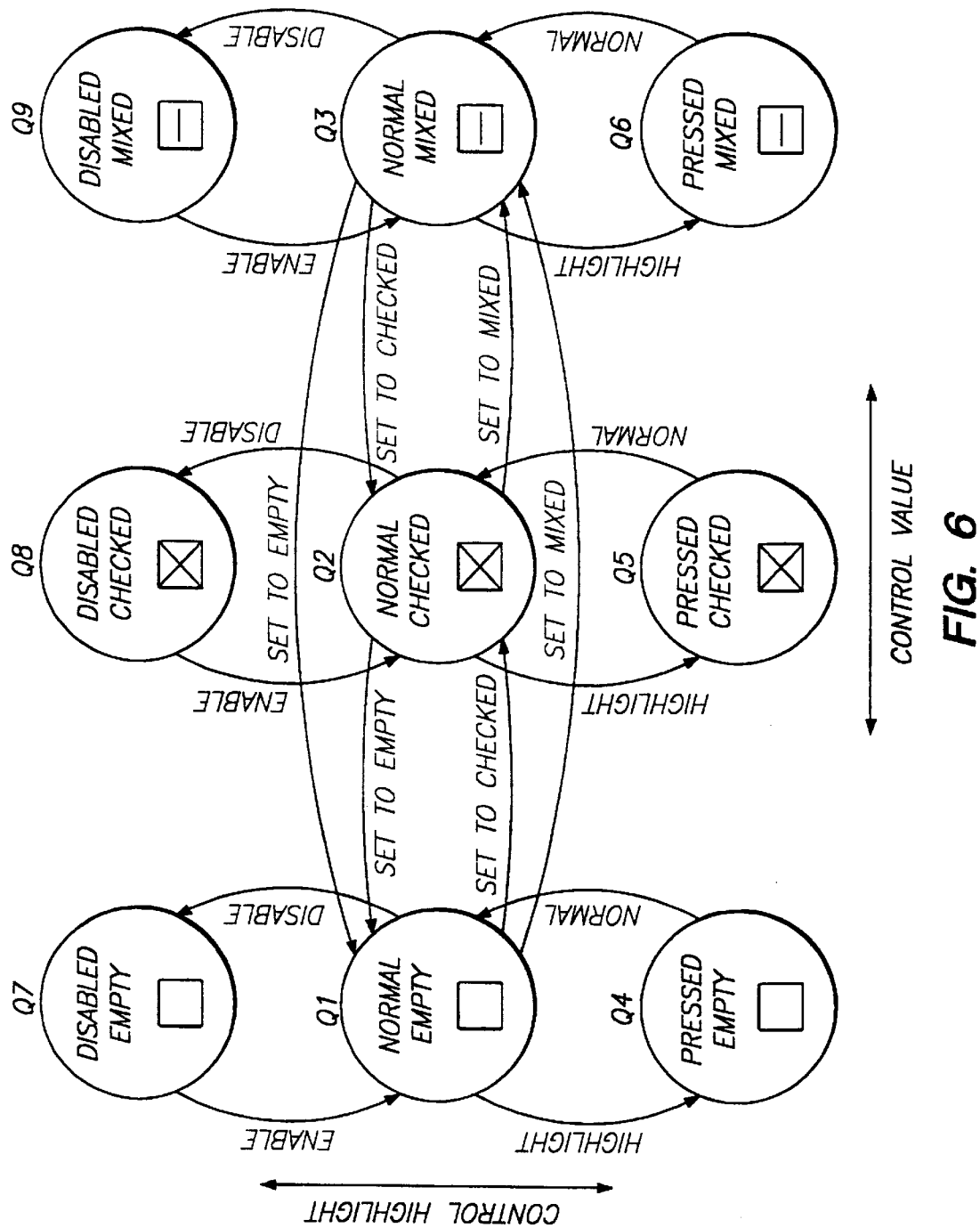
FIG. 6 is a state diagram used to illustrate transitions of an interface object part according to an exemplary embodiment of the present invention.

As seen in FIG. 6, this exemplary checkbox has nine possible states which can be displayed. These states include three highlighted states for each of the control's three values. In normal use, when a user clicks on an unchecked checkbox (state Q1), this action moves the control to its pressed state (state Q4). After the mouse is released, the control returns back to its original state (state Q1) and the application is notified of the button which has been pressed. The application then switches the value of the control to its new value, which might be checked (state Q2).

In data driven themes according to the present invention, a resource exists for each of the customizable controls to allow the theme designer to plug in new glyphs or bitmaps for each of the states of the control. Moreover, to provide more flexibility to customize transitions between states and a control state table, a matrix for these transitions can be provided. Note for example the exemplary matrix illustrated in FIG. 7. For each block in the matrix, a theme designer can provide a visual and/or audio output such as an animation, sound, a custom transition procedure which can perform some type of algorithmic transition, e.g., a kaleidoscopic display or any combination thereof. Of course, not every box in the transition matrix need be filled in by the theme designer and where no transition behavior is specified, or if the theme does not specify a special transition behavior, the control moves directly to the glyph or bitmap that is specified for the new state without any transitional effect.

Although the foregoing two exemplary embodiments describe switching either the code or the data of the drawing procedures, those skilled in the art will appreciate that both schemes can be implemented in the same interface. For example, it may be advantageous to generate certain themes, e.g., themes using relatively simple patterns, by way of hard-coded drawing procedures to provide a speedy redrawing of the interface. Similarly, where a theme is, for example, relatively more complicated graphically, it may be advantageous to generate such themes using the aforedescribed data-driven drawing procedures. Accordingly, since many different types of themes are available for user selection, it is anticipated that both of the above-described exemplary embodiments can be deployed in the same interface and the switchable pointers will then either point to the appropriate hard-coded procedure or to the parametric drawing procedure.

Pattern Look-up Tables and Drawing Support

The following is a more detailed description of the pattern look-up table mechanism 48. As described above, since one of the objects of the present invention is to provide interfaces which facilitate user control over the appearance of the desktop, the themes used by the appearance management layer 40 should be able to operate on a variety of color data to draw the interface, e.g., a color pattern, a pattern defined on a pixel-by-pixel basis, bitmapped image or the like, etc. The pattern tables provide a system and method for specifying this color data, so that the theme color set can be edited independently of the theme using resource-editing utilities. The pattern tables provide this support by abstracting the notion of pen pattern and color, allowing an application or theme to draw interface pieces without being locked to a particular color set.

This functionality is provided according to exemplary embodiments of the present invention by a mechanism including a pattern look-up table. An index in a pattern look-up table references data for a color, a pattern defined on a pixel-by-pixel basis, bitmapped image or the other data, so that the client need not know anything about the datatype contained in the pattern look-up table entry. The significance of this data independence is that a theme having solid-colored windows, for example, can be changed to instead draw the windows in a complex pattern, without changing the theme source code simply by editing the table entries.

When reference is made below to the terms "pattern" or "patterns", it is intended to denote any type of graphic data that can be used in a pattern look-up table to draw in a graphics port. As such, this may be a solid color defined in terms of its red, green and blue (RGB) components, or a pattern defined on a pixel-by-pixel basis, e.g. a PixPat, or a new type of data.

Before discussing the various features of the pattern table routines in great detail, an overview of how color and pattern abstraction can be provided according to an exemplary embodiment will be described with reference to FIG. 9. Therein a client 60 sends a command ThemeFillRect (kColorIndex) to the appearance management layer. This command is one of a set of drawing primitives implemented by the appearance management layer 40. In this particular example, it is a command to draw a rectangle that is filled with the pattern specified as kColorIndex. The value of kColorIndex corresponds to a predetermined object or object part on the desktop. For example, index 3 might correspond to the window title color. However, note that the client 60 need have no knowledge of the particular color which is currently being implemented as the window title color, but only the absolute index which identifies that color.

The kColorIndex parameter has a corresponding entry in the part index table 62. This entry maps into the theme pattern look-up table 64. As described previously, the entries in the theme pattern look-up table 64 can include any type of color or pattern data in any format. For the purposes of this example suppose that the entry in the part index table corresponding to the value of kColorIndex maps into a pattern called 'xpat' referring to a black and white criss-cross pattern. 'Xpat'0 has a corresponding entry in the pattern definition procedure table 66 where the procedure for drawing this black and white criss-cross pattern is located. This table includes a procedure pointer 68 which translates the commands defined by the 'xpat' record into commands which are recognized by the graphic subsystem 56 used by the system to draw the pattern onto the display. These commands are then sent to the graphic subsystem which displays the pattern at the appropriate point on the desktop interface.

Figure 10:
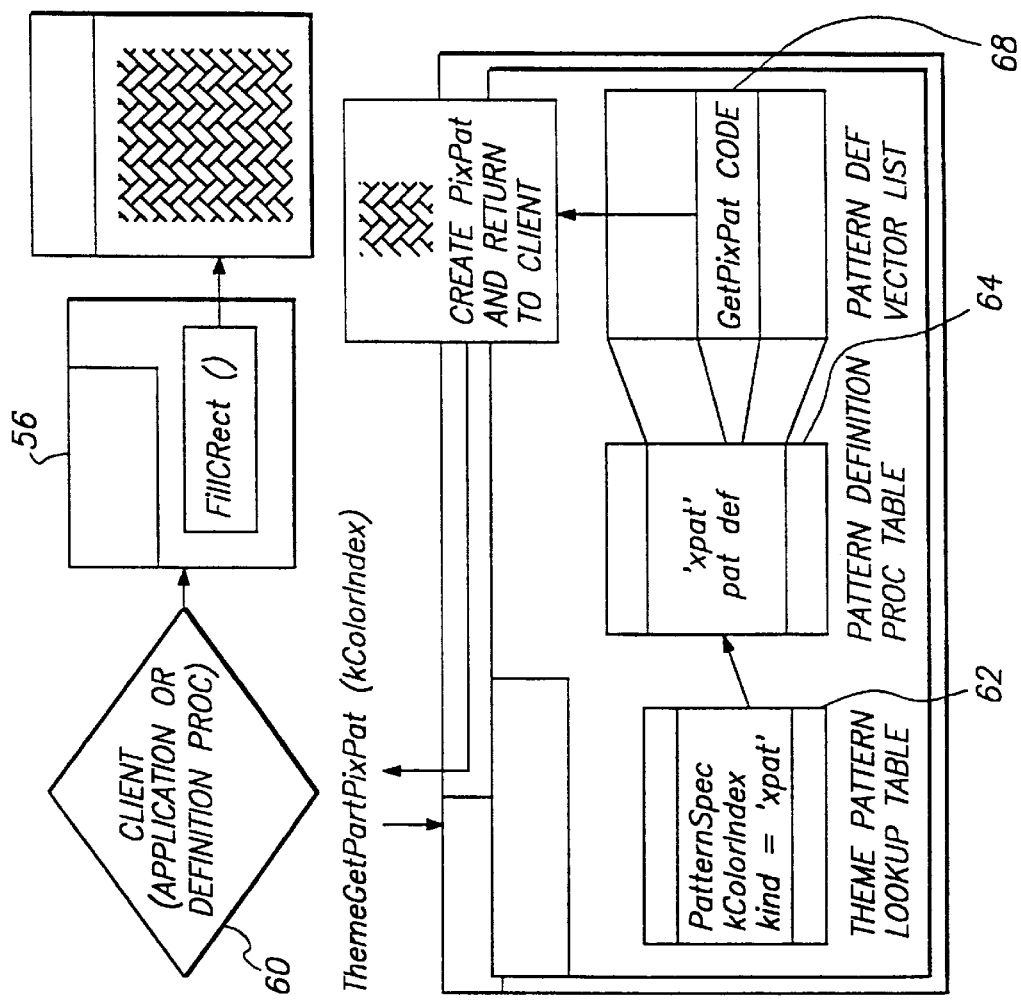
FIG. 10 is a block diagram which also illustrates pattern abstraction, but according to another exemplary embodiment of the present invention.
Figure 8:
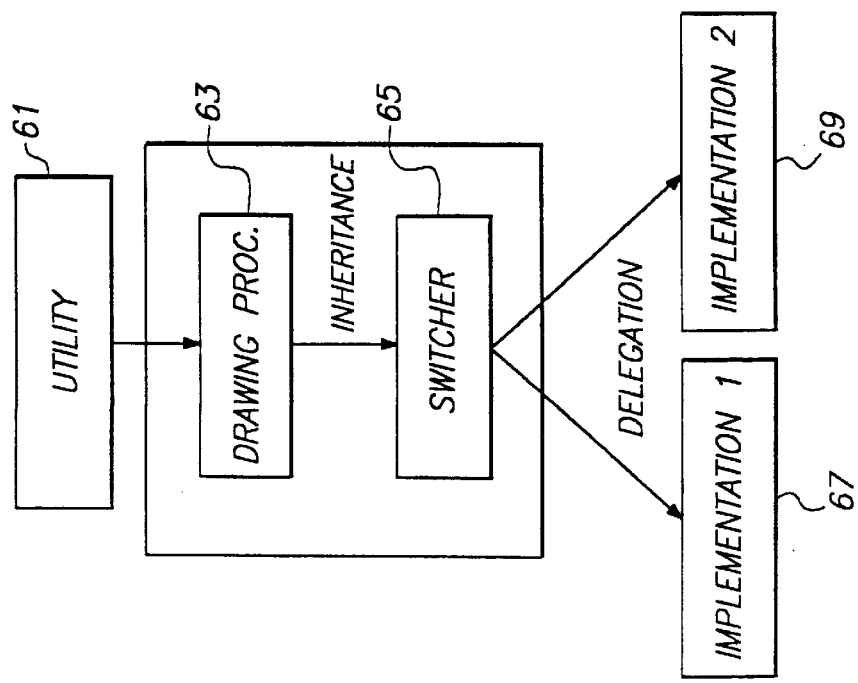
FIG. 8 is a block diagram illustrating inheritance according to an exemplary embodiment of the present invention.

Although the exemplary embodiment illustrated in FIG. 8 portrays the client as using drawing primitives to send commands through the appearance management layer to the graphic subsystem, other exemplary embodiments of the present invention operate in a somewhat different fashion. According to this exemplary embodiment, the appearance management layer 40 does not command the graphic subsystem 56, but simply acts essentially as a pattern/color database. For example, in the exemplary block diagram of FIG. 10, a get theme pattern command is sent to the appearance management layer 40, instead of the drawing primitive in FIG. 8. The appearance management layer returns a pattern structure which can be rendered by the graphic subsystem in the currently implemented theme for the particular interface object or object part requested in the get theme pattern command, to the client which then sends its own command to the graphic subsystem to draw the appropriate pattern and/or color on the desktop interface. This alternate exemplary embodiment also has the benefits described herein with respect to abstracting the pattern/color combination from the interface.

Thus, through the use of pattern tables, the color and/or pattern of desktop objects can be readily switched from one theme to another by changing the values in the part index table 62 and/or the pattern look-up table 64. This switching of patterns is totally transparent to the application. As a result, new patterns can be added without any need to change the application itself. Having now described an overview of pattern and color abstraction according to the present invention, a more detailed description of exemplary routines for implementing the above will now be provided.

The appearance management layer, according to certain exemplary embodiments, recognizes a set of drawing primitives which can be, for example, derived from those used by the system's graphic subsystem (for example, QuickDraw). These primitives can have the same calling sequence as their counterparts in the graphic subsystem, but use indices into the theme pattern table to specify the color and/or pattern details of the requested drawing command. Exemplary drawing primitives are illustrated below along with descriptions in italics.

```
typedef unsigned char OSType [4];
typedef short SInt16;
typedef unsigned short UInt16;
typedef unsigned long UInt32;
typedef UInt16 ThemePartIndex;
    pascal OSErr ThemeSetPen (ThemePartIndex);
    Sets the pen pattern to the contents of the specified index of the
theme pattern look-up table.
    pascal OSErr ThemeFrameRect (ThemePartIndex, Rect *r);
    pascal OSErr ThemeFilmRect )ThemePartIndex, Rect *r);
    Fills or frames the rectangle with the contents of the specified index.
    pascal OSErr ThemeFrameRoundRect (ThemePartIndex, Rect *r,
    radius);
    pascal OSErr ThemeFillRoundRect (ThemePartIndex, Rect *r,
    radius);
    Fills or frames the round rectangle with the contents of the
specified pattern index.
    pascal OSErr ThemeFrameOval (ThemePartIndex, Rect *r);
    pascal OSErr ThemeFillOval (ThemePartIndex, Rect *r);
    Fills or frames the oval with the contents of the specified
    pattern index.
    pascal OSErr ThemeFramePoly (ThemePartIndex, PolyHandle);
    pascal OSErr ThemeFillPoly (ThemePartIndex, PolyHandle);
    Fills or frames the polygon with the contents of the
    specified pattern index.
    pascal OSErr ThemeFrameRgn (ThemePartIndex, RgnHandle);
    pascal OSErr ThemeFillRgn (ThemePartIndex, RgnHandle);
    Fills or frames the region with the contents of the
    specified pattern index.
```

The appearance management layer can also define a set of bevel, text and dialog grouping rectangle primitives which can be used by clients for drawing bevels and dialog group rectangles in a standard appearance. The implementations of these routines can be overridden by the theme to generate special appearances. For this reason, the client should not draw bevels independent of the appearance management layer for user interface object parts, but should instead use the provided primitives. Exemplary primitives are shown and described below.

```
    pascal OSErr ThemeDrawBevel (Rect *pBevelRect, Boolean
    fbutton); pascal
    pascal OSErr ThemeDrawInsetBevel (Rect *pBevelRect, Boolean
    fbutton);
    Draws a bevel into or out of the background. If fbutton is set,
    then the bevel
corners are left out, resulting in a standard 'beveled button' visual.
    pascal OSErr ThemeDrawDeepBevel (Rect *pBevelRect,
    Boolean fbutton);
    pascal OSErr ThemeDrawDeepInsetBevel (Rect *pBevelRect,
    Boolean fbutton);
    Draws a deep bevel into or out of the background.
    pascal OSErr ThemeDrawsInsetTextFrame (Rect *rTextFrame);
```

-continued

```
    Draws the standard inset frame which is used for edit text
    items in dialogs.
    pascal OSErr ThemeDrawRidge (Rect *pRidgeRect);
    pascal OSErr ThemeDrawInsetRidge (Rect *pRidgeRect);
    Draws a ridge frame into or out of the surface.
    pascal OSErr ThemeDrawEmbossedString (StringPtr, scriptcode);
    pascal OSErr ThemeDrawInsetString (StringPtr, scriptcode);
    Draws a string embossed out of, or inset into, the surface.
    pascal OSErr ThemeDrawShadowedString (StringPtr, scriptcode);
    Draws a string with a shadow.
    pascal OSErr ThemeMeasureEmbossedString (StringPtr, scriptcode,
    Rect);
    pascal OSErr ThemeMeasureInsetString (Stringptr, scriptcode,
    Rect *);
    pascal OSErr ThememeasureShadowedString (StringPtr, scriptcode,
    Rect);
    Measure the size of the string when embossed.
    pascal OSErr ThemeDrawGroupingRect (Rect *pGroupRect,
    Str255grouptitle);
    Draws a dialog item grouping rect with the specified title. An
    empty or nil
title may be passed and no title will be drawn.
    pascal OSErr ThemeDrawSeparatorLine (Int16 length, Boolean
    fvertical);
    Draws a horizontal or vertical separator line.
```

Pattern look-up tables are provided as part of the package which handles drawing requests, either with the aforedescribed drawing primitives or alone, which tables will now be described in somewhat more detail.

A pattern data structure holds the data necessary to draw a pattern. It can have, for example, the following structure:

typedef UInt32 PatternData[2];

typedef PatternData *PatternDataPtr;

The pattern data structure can be, for example, an eight-byte structure used to store pattern and/or color information. If the data required for the pattern is more than eight bytes long, it can be stored in a handle and the handle placed in the pattern data structure. A pattern definition procedure, described below, is a component which is responsible for the loading and interpretation of a pattern data structure.

The pattern look-up table specifies the list of colors and patterns used by a theme. A pattern look-up table contains a list of records, e.g., Pattern Spec record 'xpat' in FIG. 9, each of which is typed and references a specialized procedure to load, unload and draw.

Figure 9:
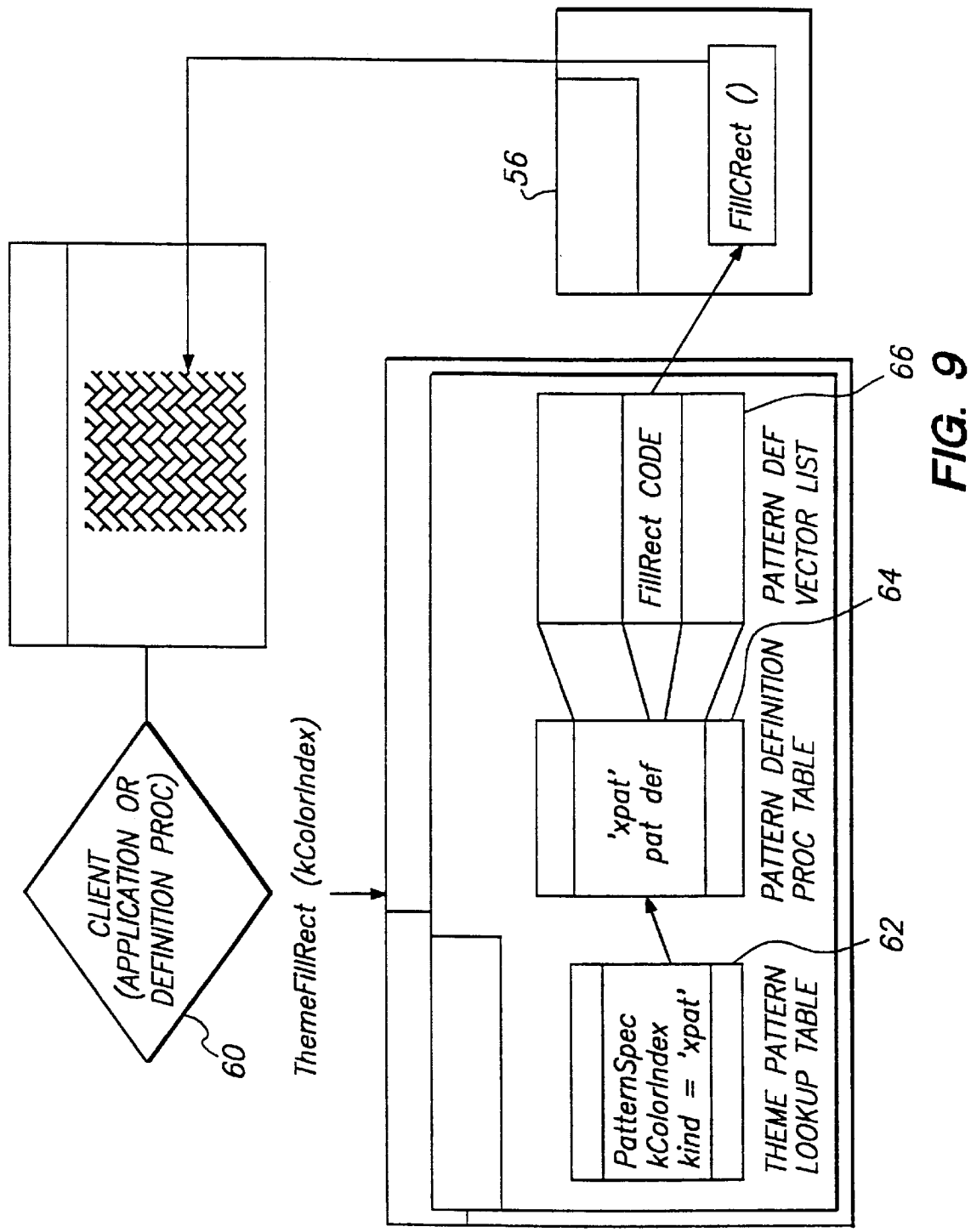
FIG. 9 is a block diagram which illustrates pattern abstraction according to an exemplary embodiment of the present invention.

Data encapsulation within a pattern look-up table entry is accomplished through use of a pattern definition procedure, a code module responsible for loading, unloading and interpreting a pattern look-up table entry's data, e.g., the pattern definition procedure 'xpat' of block 66 in FIG. 9. New pattern types may be defined by a theme for specific needs, such as algorithmic color and pattern generation, simply by adding new pattern definition procedures. A pattern definition procedure can be defined, for example, as a code fragment module or a dynamically loaded library which exports a list of entrypoints as set forth below. The default behavior for unimplemented entrypoints is to return an error.

```
    OSErr PatDefOpen (OSType *pPatternType);
    Called when the pattern def is initially loaded, to allow the procedure
to initialize state data. *pPatternType should be set to an OSType denoting
the pattern type it will handle, for example 'xpat' or 'ppat'.
    OSErr PatDefClose ();
    Called when the pattern def is no longer needed, to allow release of
state data.
```

-continued

```
OSErr PatDefLoadData (PatternDataPtr, Int16 id, Int16 index);
    Load the data associated with this pattern from a resource, and place
the data in the PatternData record pointed to by PatternDataPtr.
OSErr PatDefSetData (PatternDataPtr, PatternDataPtr newdata);
    Set the pattern data to a copy of that located in newdata.
OSErr PatDefFreeData (PatternDataPtr);
    Free the data in the PatternData record pointed to by PatternDataptr.
OSErr PatDefSetPen (PatternDataPtr);
    Set the port's pen to draw with the pattern.
OSErr PatDefFrameRect (PatternDataPtr, Rect *);
OSErr PatDefFillRect (PatternDataPtr, Rect *);
    Fill or frame the rectangle.
OSErr PatDefFrameRoundRect (PatternDataPtr, Rect *,
UInt16 w, UInt16 h);
OSErr PatDefFillRoundRect (PatternDataPtr, Rect *, UInt16 radius);
    Fill or frame the rounded rectangle.
OSErr PatDefFrameOval (PatternDataPtr, Rect *prect);
OSErr PatDefFillOval (PatternDataPtr, Rect *prect);
    Fill or frame the oval contained in the rect.
OSErr PatDefFramePoly (PatternDataPtr, PolyHandle hpoly);
OSErr PatDefFillPoly (PatternDataPtr, PolyHandle hpoly);
    Fill or frame the polygon.
OSErr PatDefFrameRgn (PatternDataPtr, RgnHandle rgn);
OSErr PatDefFillRgn (PatternDataPtr, RgnHandle rgn);
    Fill or frame the Range.
```

Pattern look-up tables may be created in memory by applications to allow them the benefits of a pattern look-up table within the application. An exemplary application program interface (API) for creating pattern look-up tables is described below.

Themes can also define new pattern types to take advantage of special theme-specific behavior, such as algorithmically defined patterns. To do this, the theme provides a resource defining the pattern type or registers a code fragment module or dynamically loaded library using, for example, the InstallPatternDefinition command described below. The pattern definition procedure will be added to the internal type list of the system, and will be called directly to load, unload and draw patterns of the corresponding type. This code can be stored as a code fragment module or dynamically loaded library, and remains loaded as long as there are pattern look-up table entries which reference its type. For this reason, pattern definitions can remain installed even after the theme which created the pattern is unloaded in case these definitions are used by other applications.

```
pascal OSErr InstallPatternDefinition (ConnectionID
                                            cfmConnection);
    Install the specified pattern definition in a pattern handler list. If a
handler for that type has already been installed, an error is returned. The
pattern definition's type (as returned by PatternDefGetType) should be
unique, and the PatternDef is locked and loaded in the system heap.
```

When a pattern definition procedure is installed, it can be added to an internal pattern definition table. For speed, these pattern definition procedures can be referenced by index rather than type in the pattern look-up table. When a new pattern is added to the pattern look-up table, the pattern definition table is scanned and the index of the definition for

```
typedef void *PatternTableRef;
typedef UInt16 PatternIndex;
pascal OSErr NewPatternSpecTable (PatternTableRef*);
pascal OSErr DisposePatternSpecTable (PatternTableRef);
Creates and Disposes a PatternSpecTable.
pascal OSErr AddPatternSpecToTable (PatternTableRef, OSType patternkind,
PatternDataPtr pdata, PatternIndex *pindex);
    Adds a new pattern spec to a PatternSpecTable. Patterns are always added to
the end of the table. The index at which the pattern is placed is returned in pindex.
    pascal OSErr GetPatternIndexType (PatternTableRef, PatternIndex, OSType
*patternkind);
    Returns the type of pattern located in the specified index of the table.
    pascal OSErr SetPatternSpecData ( PatternTableRef, PatternIndex, OSType
patternkind, PatternDataPtr pdata);
    Set the pattern spec at the specified index to contain the specified data.
    pascal OSErr PatternTableSetPen (PatternTableRef, PatternIndex);
    Sets the pen pattern to the contents of the specified index of the theme pattern
look-up table.
    pascal OSErr PatternTableFrameRect (PatternTableRef, PatternIndex, Rect *r)
    pascal OSErr PatternTableFillRect (PatternTableRef, PatternIndex, Rect *r);
    Fills or frames the rectangle with the contents of the specified index.
    pascal OSErr PatternTableFrameRoundRect (PatternTableRef, PatternIndex,
                                    Rect *r, radius);
    pascal OSErr PatternTableFillRoundRect (PatternTableRef, PatternIndex, Rect
                                    *r, radius);
    Fills or frames the round rectangle with the contents of the specified pattern
index.
    pascal OSErr PatternTableFrameOval (PatternTableRef, PatternIndex, Rect *r);
    pascal OSErr PatternTableFillOval (PatternTableRef, PatternIndex, Rect *r)
    Fills or frames the oval with the contents of the specified pattern index.
    pascal OSErr PatternTableFramePoly (PatternTableRef, PatternIndex,
                                    PolyHandle);
    pascal OSErr PatternTableFillPoly (PatternTableRef, PatternIndex,
                                    PolyHandle);
    Fills or frames the polygon with the contents of the specified pattern index.
    pascal OSErr PatternTableFrameRgn (PatternTableRef, PatternIndex,
                                    RgnHandle);
    pascal OSErr PatternTableFillRgn (PatternTableRef, PatternIndex,
                                    RgnHandle);
    Fills or frames the region with the contents of the specified pattern index.
``` the pattern type is inserted into the record for the new pattern. As new types are added, they can be added at the end of the list.

When a new pattern definition procedure is added to the internal pattern definition table, a list is built which includes the exported pointers contained in the pattern definition. If any standard pointers are not defined, they are set to a default pointer which simply returns an unimplemented error. As discussed above with reference to FIG. 9, when a pattern is drawn, the pattern is found is the pattern look-up table and its corresponding pattern definition procedure is located, then the desired function pointer is called.

An example of a pattern definition procedure is shown below, which procedure is used to get a pattern defined on a per pixel basis from the look-up table and command the graphic subsystem to draw same.

```
// structure for interpreting contents of our PatternData struct
typedef struct
{
    PixPatHandle hPixPat;
    UInt32 unused;        // PatternData struct is 8 bytes, pad to fit
}
PixPatData, *PixPatDataPtr;
OSErr PatDefOpen (OSType *pPatternType)
{
    *pPatternType = 'ppat';    // return type
    *pRefCon = (RefCon) 0;     // no refcon used
    return    noerr;
}
OSErr PatDefClose ()
{
    return    noerr;
}
OSErr PatDefLoadData (PixPatDataPtr *pdata, Int16 id, Int16 index)
{
    pData->hPixPat = GetPixPat (id);
    if (pData->hPixPat == nil)
        return MemError();
    return    noerr;
}
OSErr PatDefFreeData (PixPatDataPtr *pdata)
{
    DisposePixPat (pData->hPixPat);
    return noerr;
}
OSErr PatDefSetData (PixPatDataPtr *pdata, PixPatDataPtr *pNewData)
{
    if (!pData->hPixPat)
    {
        NewPixPat (&pData->hPixPat);
        if (!pData->hPixPat)
            return QDError ();
    CopyPixPat (pNewData->hPixPat, pData->hPixPat);
    return noerr;
}
OSErr PatDefSetPen (PixPatDataPtr *pdata)
{
    PenPixPat (pData->hPixPat);
    return noerr;
}
OSErr PatDefFrameRect (PixPatDataPtr *pdata, Rect *prect)
{
    FrameCRect (pData->hPixPat);
    return    noerr;
}
OSErr PatDefFillRect (PixPatDataPtr *pdata, Rect *prect)
{
    FillCRect (pData->hPixPat);
    return noerr;
}
```

The appearance management layer also defines a range of common pattern indices that can be included in each theme's pattern look-up table so that these indices are available to all clients. These include the set of patterns used to generate bevels and groups, along with other useful patterns, for example, the current background of the menu bar. The current background of the menu bar index may be passed to one of the standard theme drawing routines to draw shapes in the menu bar color. Below, for illustration purposes, an exemplary set of such common pattern indices is defined.

```
enum {
    // standard beveling colors
    kBevelBackgroundIndex = 0,
    kBevelFrameIndex,
    kBevelFaceIndex,
    kBevelShadowIndex,
    kBevelHiliteIndex,
    kBevelCornerIndex,
    kBevelAuxShadowIndex,
    kBevelAuxHiliteIndex,
    kBevelAuxCornerIndex,
    kBevelHiliteCorner,
    kBevelShadowCorner,
    kInvBevelFrameIndex,
    kInvBevelFaceIndex,
    kInvBevelShadowIndex,
    kInvBevelCornerIndex,
    kInvBevelHiliteIndex,
    kInvBevelAuxShadowIndex,
    kInvBevelAuxCornerIndex,
    kInvBevelAuxHiliteIndex,
    kInvBevelHiliteCorner,
    kInvBevelShadowCorner,
    // text frames
    kTextFrameFillIndex,
    kTextFrameFrameIndex,
    kTextFrameHilightIndex,
    kTextFrameShadowIndex,
    // standard ridge and group indices
    kGroupHilightIndex,
    kGroupShadowIndex,
    kGroupCornerIndex,
    kGroupTextIndex,
    kRidgeHilightIndex,
    kRidgeShadowIndex,
    kRidgeCornerIndex,
    kRidgeAuxCornerIndex,
    // beveled - shadowed text
    kTextIndex,
    kTextShadowIndex,
    kTextHilightIndex,
    kTextCornerIndex,
    // custom
    kThemeCustomRangeStart = 16384
    };
typedef UInt16 ThemePatternIndex;
```

In addition to these exemplary defined types, a theme may define additional types which are used internally. These additional types can be indexed sequentially starting from whatever next highest index is available, e.g., 16384 in the example given above.

The following illustrates three exemplary pattern types which can be defined for usage in the appearance management layer. Therein, the command RGBColor specifies a red, blue or green color combination with which to draw an object or object part. ColorPattern describes a two-color 8×8 pixel pattern with a fore and backcolor, each specified with an RGBColor. An exemplary definition of a ColorPattern type is shown below:

```
typedef struct
   {
   RGBColor forecolor;
   RGBColor backcolor;
   Pattern pattern;
   }
```

A PixPat type specifies an arbitrary pattern defined on a per-pixel basis, wherein a designated area may be filled or drawn with the pattern contents by the graphics subsystem. The PixPat (Pixel Pattern) data structure is defined by the graphics subsystem, and is used to contain this per-pixel pattern.

Themes provide a set of standard pattern look-up resources for use by the appearance management layer which are described below. The pattern lookup table defines the set of colors and patterns used by the theme and is used to build the theme's pattern look-up table. The part index table maps the set of standard theme pattern indices into the pattern look-up table. An exemplary implementation of a PatternLookupTable and a PartIndexTable is:

```
#define kPatRGBKind 'clut'       //color lookup table id + index
#define kPatPixPatKind 'ppat'    //PixPat id
#define kPatColorPatKind 'cpat'  //ColorPattern id
// Pattern Lookup Tables
typedef struct
   {
   OSType patternKind;      // kind of pattern, ie. kPatRGBKind
   SInt16 patternID;        // pattern resource identifier
   UInt16 index;            // index within resource
   UInt32 patternData [2];  // pattern data holder when loaded
   }
PatternLookupTableEntry;
typedef struct
   {
   UInt16 numEntries;                 // count of entries in table
   PatternLookupTableEntry entries []; // array of entries
   }
PatternLookupTable;
// Part Index Tables - maps a ThemePatternIndex into a Pattern Lookup
Table
typedef struct
   {
   ThemePatternIndex index;  // corresponding ThemePatternIndex
   UInt16 plutIndex;         // PatternLookupTable index
   }
PartIndexEntry;
typedef struct
   {
   UInt16 numEntries;         // count of entries in table
   PartIndexEntry entries []; // array of entries
   }
PartIndexTable;
```

As mentioned earlier, other exemplary embodiments of the present invention provide for pattern/color abstraction by returning information to the client rather than the appearance management layer commanding the graphic subsystem directly. According to these embodiments, the client will ask the appearance management layer for a structure, e.g., a PixPat structure, corresponding to a specified index and will receive a handle that will allow the application to make the appropriate drawing call to the graphic subsystem 56. An example for this embodiment is illustrated below in pseudocode:

```
typedef struct
   {
   UInt32 data [2];     // data block for pattern definition use
   }
PatternData;
OSErr PatternDefOpen ();
Opens the pattern definition, initializing any global state data. The pattern
def may return an error code to veto loading (for example if the pattern
def
cannot run on the current system configuration).
OSErr PatternDefClose ();
Closes the pattern definition and frees any global state data. This is called
prior to termination of the pattern def's connection.
OSErr PatternDefGetKind (OSType *pKind);
Returns the pattern kind identifier. This is invoked by the appearance
management layer to find the link to entries in the pattern table.
OSErr PatternDefLoadData (PatternData *pData, SInt16 resId, UInt16
index);
Loads the pattern data from a resource, based upon the resource
id + index.
OSErr PatternDefCloneData (PatternData *pData, PatData *pCopy);
Clones the pattern data contained in the PatData record and places the
result in *pCopy.
OSErr PatternDefSetData (PatternData *pData, PatData *pNewData);
Sets the pattern data to a copy of that contained in *pNewData.
OSErr PatternDefUnloadData (PatternData *pData);
Frees the data stored in the pattern data record.
OSErr GetPatternPixPat (PatData *pData, PixPatHandle *hPixPat);
Returns the PixPat represented by the pattern data.
OSErr ApplyShapeStyle (PatData *pData, GXShape shape);
Modifies the state of the GX object so that it draws in the desired
style. This may include creating ink, transform or other style objects and
linking them to the shape, or modifying the shape itself.
```

Another example of how a client would interact with the pattern lookup tables 48 according to these exemplary embodiments is illustrated below.

```
OSErr NewPatternTable (PatternTable *table);
Creates a new pattern table.
OSErr GetNewPatternTable (SIntl6 resID, PatternTable *table);
Gets a new pattern table from a resource.
OSErr DisposePatternTable (PatternTable *table);
Dispose a pattern table.
OSErr GetPatternDef (<PatternDef Reference>, SOMObject
*patternDefObject);
Load a pattern definition proc and return its SOM Object.
OSErr AddPatternDefToTable (PatternTable table, SOMObject
patternDefObject);
Add the pattern definition proc to the table.
OSErr PatternTableSetIndexData (
      PatternTable table, UInt16 index, OSType kind, PatternData *pData);
Set the data record associated with the table index.
Application Pattern and Style Queries
OSErr ThemeGetPartPixPat (PartCode part, PixPatHandle *partPixPat);
Gets the PixPat associated with the part code.
OSErr ThemeApplyPartStyleToShape (PartCode part, GXShape shape);
Sets the style of the GXShape to the part style.
OSErr PatternTableGetPixPat (
      PatternTable table, UInt16 index, PixPatHandle *hPixPat);
Gets the PixPat associated with the table + index.
OSErr PatternTableApplyStyleToShape (
      PatternTable table, UInt16 index, GXShape shape);
Sets the style of the GXShape to that associated with the table + index.
OSErr ThemeGetPartSeed (UInt32 *seed);
Returns the seed for the theme pattern table. The seed is updated when
changes are made to the pattern table which may invalidate cached
PixPatsHandles.
OSErr PatternTableGetSeed (UInt32 *seed);
Returns the seed for the application pattern table. The seed is updated
when changes are made to the pattern table which may invalidate cached
```

-continued

```
PixPatsHandles.
SPI
OSErr InstallSystemPatDef (SOMObject patternDefObject);
Installs a pattern definition in the system PatDef table.
```

Having described two exemplary embodiments wherein pattern look-up tables can be used to abstract patterns and colors from the interface, another example is provided below in which both embodiments are applied to the exemplary application of filling a window rectangle with the bevel background color and then drawing a bevel inset two pixels in the window. First, by way of the former, exemplary embodiment wherein drawing primitives are sent to the appearance management layer.

```
Rect bevelRect;
OSErr error;
GetWindowRect (&bevelRect);
// Fill window rectangle with bevel background
error = ThemeFillRect (kBevelBackground, &bevelRect);
// make bevel inset 2 pixels from window edge
InsetRect (&bevelRect, 2, 2);
//Draw Bevel on background
error = ThemeDrawBevel (&bevelRect, false);
```

Now, using the latter exemplary embodiment wherein the appearance management layer returns a data structure to the client.

```
Rect bevelRect;
OSErr error;
PixPatHandle hBackgroundPat;
GetWindowRect (&bevelRect);
// Get bevel background PixPat
error = ThemeGetPartPixPat (kBevelBackgorund, &hBackgroundPat);
// Fill window rectangle with bevel background
if (error == noErr)
    FillCRect (&bevelRect, hBackgroundPat);
// make bevel inset 2 pixels from window edge
InsetRect (&bevelRect, 2, 2);
// Draw Bevel on background
error = ThemeDrawBevel (&bevelRect, false);
```

Of course, those skilled in the art will appreciate that all of the pseudocode examples provided herein are intended to be exemplary and illustrative in nature.

Themes and Theme Switching

Having described exemplary systems and methods for abstracting the appearance and behavior of a user interface from its functionality using switchable drawing procedures and pattern look-up tables, the following description indicates how these capabilities can be used together to manifest sets of appearance and behavior attributes on a user interface which blend together to project a common theme. As described earlier, themes are coordinated designs of the interface elements which combine to create a distinct visual and audio environment on the display. According to one exemplary embodiment of the present invention, users can choose among different themes from, for example, an appearance control panel which can be activated on the desktop interface. An exemplary appearance control panel is illustrated as FIG. 11.

Figure 11:
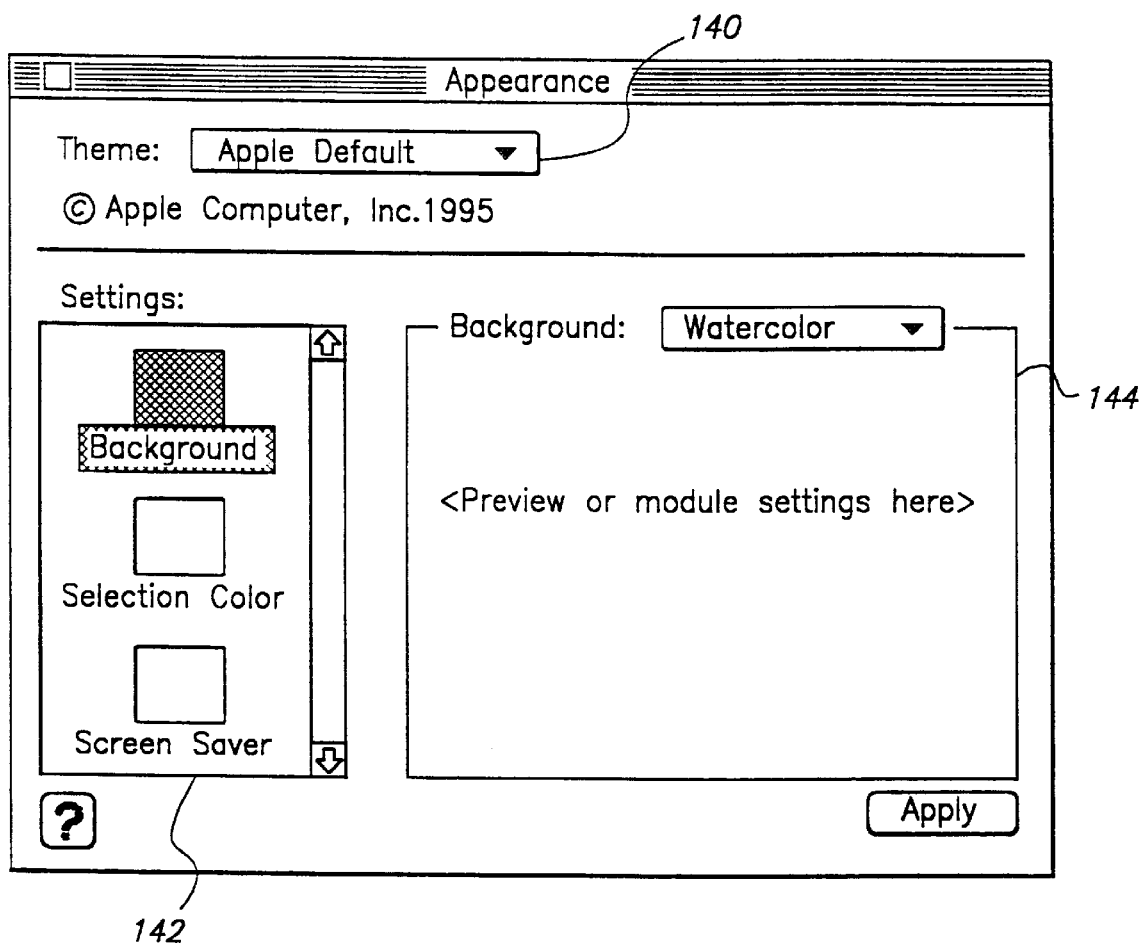
FIG. 11 illustrates an exemplary appearance control panel according to an exemplary embodiment of the present invention.

In FIG. 11, a pop-up, pull-down or drop-down menu 140 allows users to specify an overall appearance/behavior by selecting the theme to be installed. Beneath the theme setting box 140 to the left is an options area 142 in which a user may select various options within each theme. For example, a user could specify a background color, a font and a highlight color. To the right of the options area 142, is a preview area 144 where exemplary interface elements of the theme currently selected in box 140 are shown so that a user can preview what the theme will look like before making a selection. Exemplary interface elements can include, for example, a desktop pattern, a menu bar and menu, an active window, and a dialog box with radio buttons, a checkbox, push buttons, and selected text. Using the appearance control panel, a user will be able to change the appearance of the desktop quickly and easily.

However, some users may desire even more control over the appearance and behavior of their desktop interface. Thus, according to another exemplary embodiment of the present invention, the appearance control panel can provide user selectibility over all of the objects which can be displayed on the user interface. For example, the appearance control panel could include a library of each type of interface object from which the user can select for inclusion in a user-defined theme. After selecting one of each the different types of interface objects, the user can be prompted for a theme name under which pointers to the appropriate drawing procedures and other information for realizing the selected objects can be stored. According to still further exemplary embodiments of the present invention, an appearance object editor can be provided wherein a user can create his or her own interface objects using a library of parts provided by the object editor. For example, each of the glyphs illustrated in FIG. 5 can have a multitude of variations from which a user can create his or her own document window (both active and inactive). Once created, the new interface object can be stored in the library objects from which user-defined themes can be created.

Theme attributes are a collection of theme properties that are both system-defined and theme-defined. Each of the theme's properties can be queried and set by appearance management layer functions. For example, the following properties can be defined by the system:

```
#define kThemeSystemFont            'sysf'
#define kThemeTextHighlightColor    'tcol'
```

To get a theme property, a get theme property function can be called for example by:
    OSErr GetThemeProperty (OSType property, void *dataptr, Size dataSize)
This function will return the requested property from the current theme. If the current theme does not include the requested property, typeNotFoundErr is returned. To set a theme property, call the SetThemeProperty function:

```
OSErr SetThemeProperty (OSType property, void *dataptr, Size datasize)
```

The SetThemeProperty command sets the specified theme property to the given data. Having described themes in general and ways in which themes can be created, selected and stored by a user, the following describes the operation of systems and methods according to the present invention once a theme change is requested by a user or an application beginning with FIG. 12.

Figure 12:
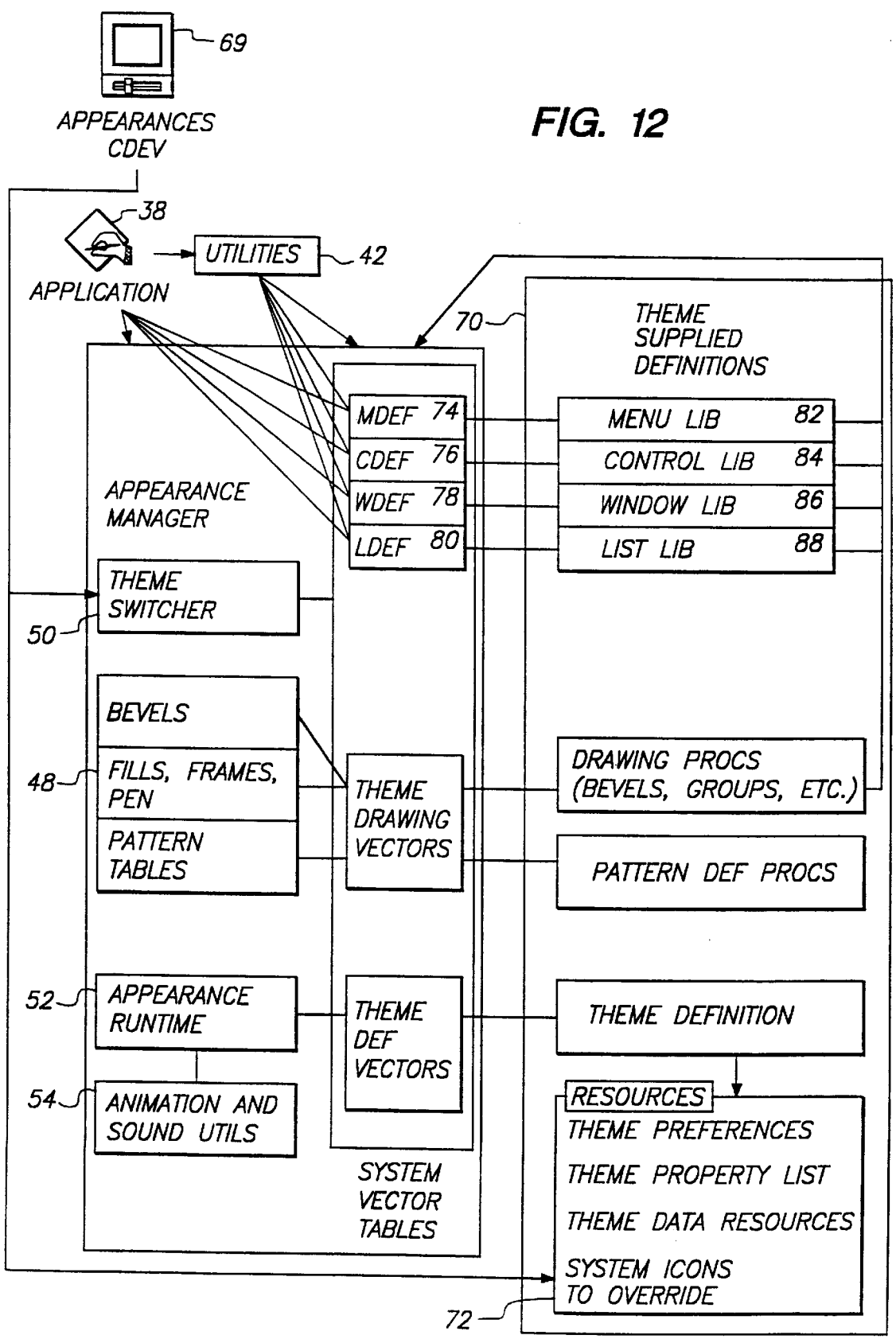
FIG. 12 illustrates an interaction between an appearance management layer, an application, and a theme according to an exemplary embodiment of the present invention.

FIG. 12 illustrates interactions between, for example, a theme 70, the appearance management layer 40, and an application 38. Therein block 48 includes the pattern tables as discussed above, and block 54 contains the animation and sound utilities which supplement the runtime routines of block 52. Further, an icon 68 is shown which diagrammatically illustrates an appearance control panel 69, e.g., the panel of FIG. 10, which an end user can operate to switch themes.

A current theme's resource chain 72 is opened and managed by the theme switching 50 and runtime routines 52. The resource chain 72 can include, for example, a theme attributes property list (e.g., behavior matrices as described above), theme preferences (e.g., a preferred background pattern, preferred system font, etc.), theme data resources (e.g., the pattern table which defines the set of patterns and colors used by the theme, pattern code procedures which allow definition of new pattern types, etc.) and override resources (e.g., icons for the theme which overrides system icons). The theme resource chain can be maintained separately from the resources of the currently running application, and can be switched in and out in response to a demand by either an application or a user (appearance control panel). The theme's resource chain 72 is setup whenever the appearance management layer 40 calls any of the theme's code.

As explained above with respect to the switchable drawing procedures according to exemplary embodiments of the present invention, when the appearance management layer is present, conventional drawing procedures (e.g., CDEF, LDEF, MDEF and WDEF) are replaced by the appearance management layer's switcher resources shown in FIG. 11 at blocks 74–80. Externally, these switcher resources serve the identical function as traditional drawing procedures. Internally, they permit dynamic switching to the appropriate drawing procedures by the utilities when the theme changes. This switching can be accomplished by supplying new pointers 82–88 to the drawing procedures referenced by switcher resources 74–78. In this way, when the switcher resources call back into the utilities as described above, the utilities will be pointed at the drawing procedures for the current theme.

The current theme is set by calling the appearance management layer's set theme function, for example, by the command:

OSErr SetTheme (const FSSpec *themefile)

The set theme function uses an FSSpec parameter that identifies the theme file that should be loaded and activated by the appearance management layer. In normal operation, this function loads the requested theme file, switches to the new theme and then releases the old theme. The old theme is released after the new theme is completely loaded so that if the new theme could not be activated, the system can revert back to the original theme such that the user does not become stranded without an interface.

Figure 13:
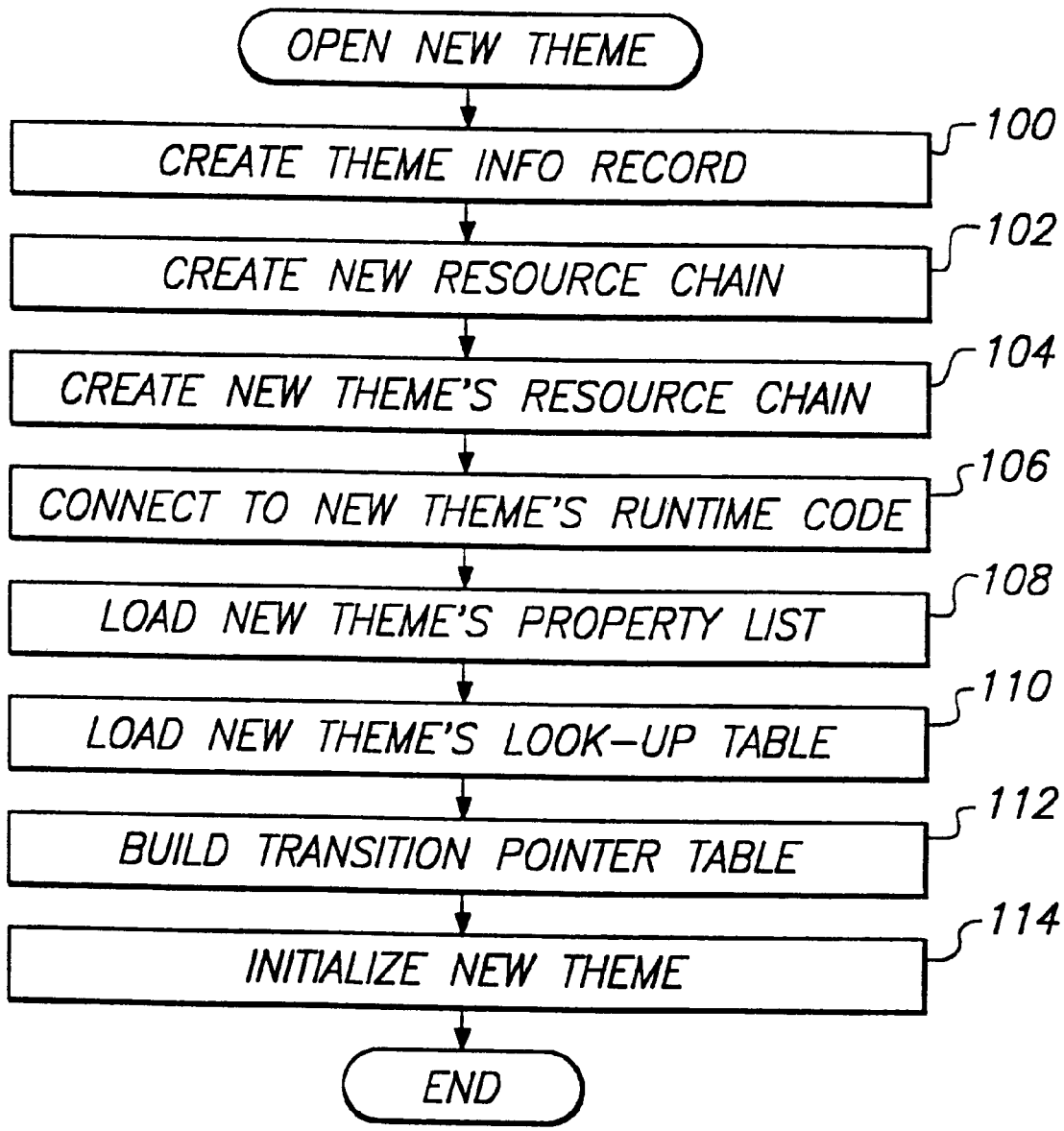
FIGS. 13–15 are flowcharts which illustrate exemplary methods used to switch themes according to exemplary embodiments of the present invention.

The exemplary steps illustrated in the flowchart of FIG. 13 can be executed to open the new theme file. At block 100, a new theme info record is created. This data structure contains all of the global information that the appearance management layer uses to keep track of the state of the current theme and contains its own resource chain information, e.g., procedure pointer tables for the switcher, the theme property list, the theme pattern tables, etc.

Next, the appearance management layer creates a new resource chain at block 102. The new theme's resource file is then opened at 104 after which the theme's runtime code is loaded, at 106, and its open function is called. At this time, the new theme can test the operating conditions of the system to determine if the load should continue or be aborted. If the load aborts, the theme may present an alert to the user as to why the theme could not be loaded. If the theme has its own preferences file, it can be opened by the theme at this time.

The theme's property list is loaded at block 108, for example, by calling a get resource function. This allows the property list to come from any preferences file that may have been opened in the previous step. If a property list is found, it is stored in the theme info record. Subsequently, at block 110, the theme's pattern look-up table is loaded. First, all pattern definition procedure resources are loaded. Then the standard pattern look-up table and part index table resources are loaded. The pattern look-up table is then built from the contents of these resources. A pointer table to be used by the switcher resources is then built as shown by block 112. This table is stored in the theme info record. Lastly, the new theme's initialize function is called at block 114. The new theme can allocate memory or load extra resources that it requires while being active.

Figure 14:
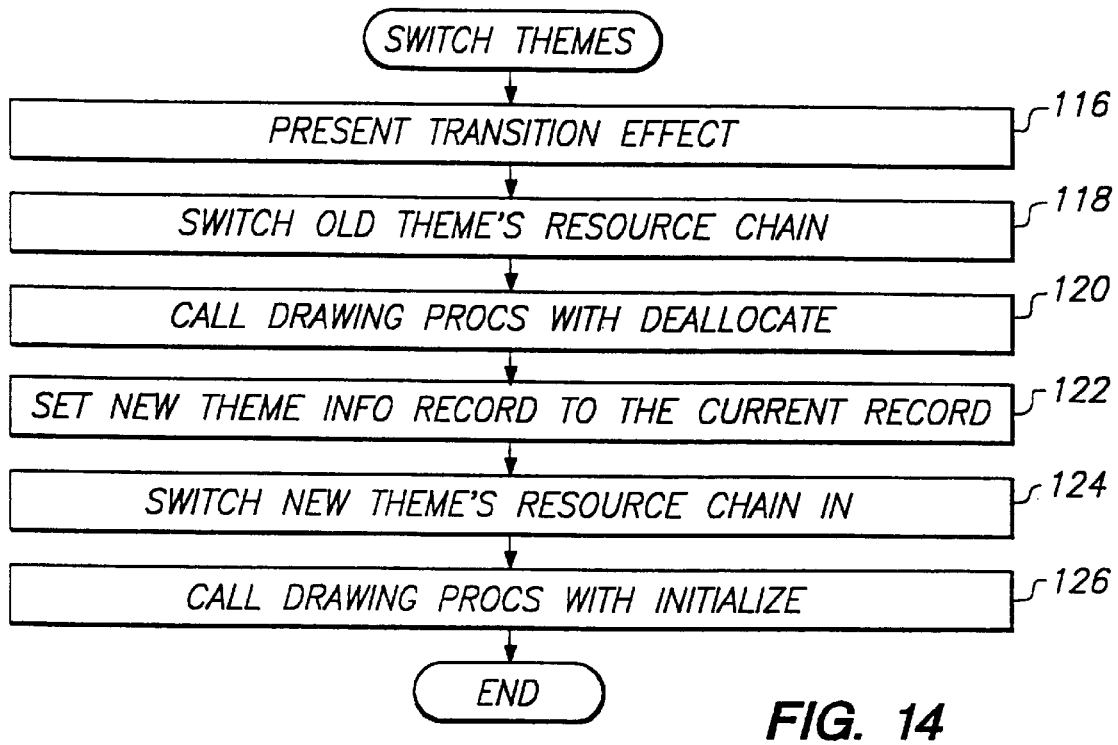

FIG. 14 illustrates steps that can be executed to switch from an old theme to a new theme. First, a transition effect can be presented as block 116. For example, the screen may fade to black, a dialog can be presented, or the themes could gradually blend from one to the other, e.g., "morphing". Then, the old theme's resource chain is switched in as described by block 118. All of the drawing procedures are called with a deallocate message. These messages 120 are sent to the appearance management layer's switcher definition procedures, which are currently routing messages to the old theme's implementations of the definition procedures. This allows any of the theme's definition functions to deallocate any global data that they may have been allocated.

The appearance management layer sets the new theme info record as the current theme's information record at 122. Once the new theme info record is set, all of the external calls into the appearance management layer will affect the new theme. The new theme's resource chain is switched in at block 124. All of the drawing procedures are called with an initialize message. These messages are sent to the appearance management layer's switcher resources, which are currently routing messages to the new theme's implementations of the drawing procedures. This allows any of the theme's definition functions to allocate any global data that they may need.

Figure 15:
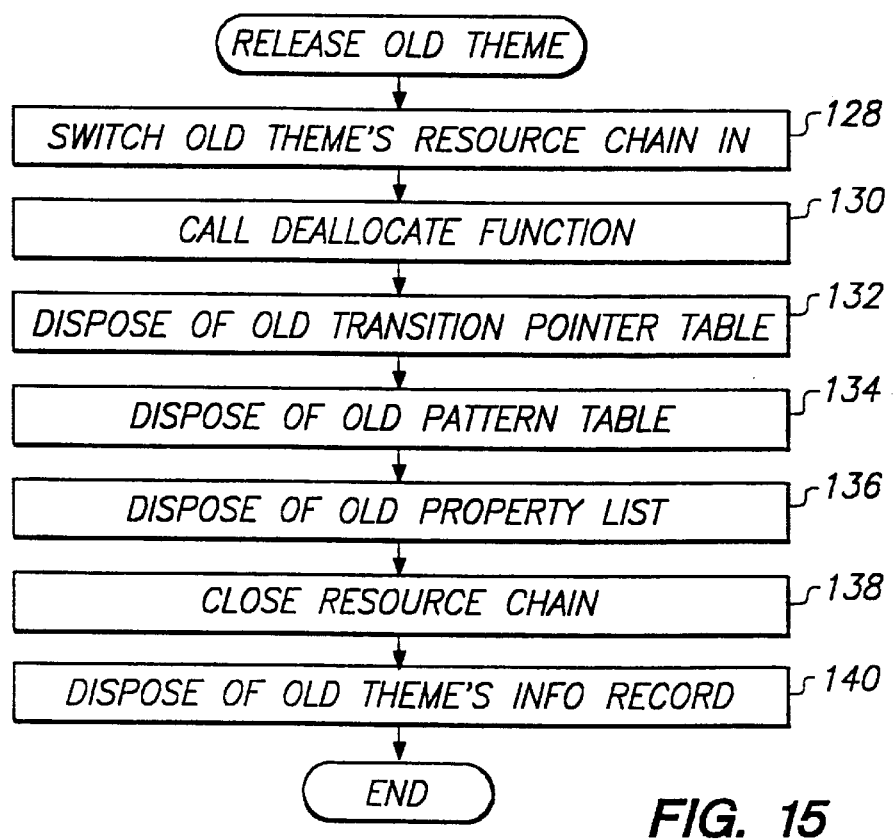

The steps executed to release the old theme file are shown in FIG. 15. First, at block 128, the old theme's resource chain is switched in. Next, the old theme's deallocate function is called at 130. The theme is responsible for disposing of any allocations that it may have made when it received its initialize message. The old pointer table used by the switcher definition procedures is disposed of per block 132. Then, the old theme's pattern look-up table and property list are disposed of as denoted by blocks 134 and 136, respectively. The files in the old theme's resource chain can then be closed and the resource chain disposed of prior to disposing of the old theme's theme info record (blocks 138 and 140).

If an error occurs while trying to open and load the new theme or while switching from the old theme to the new theme, the switch is aborted and the set theme function attempts to reverse all of the steps that have already successfully completed so that the system continues to generate an interface using the old theme. The error that caused the switch to abort can be returned by this function. To request that the default system theme is switched in, either an FSSpec parameter to the system file or NIL can be passed in the themefile parameter.

To determine what theme file is currently active, a get theme function can be called, for example by the command:

OSErr GetTheme (FSSpec *currentThemeSpec)

An FSSpec parameter value referencing the currently active theme file will be returned in the currentThemeSpec parameter. If the current theme is the default system theme, an FSSpec referencing the system file will be returned. If an error occurs while attempting to locate the FSSpec of the current theme, an appropriate error code will be returned and the currentThemeSpec parameter will remain unchanged.

Normally, the current theme's resource file is not present in the currently running application's resource chain. This can be done to prevent resource identification conflicts between applications, the operating system and the current theme. The appearance management layer maintains a separate resource chain that contains the current theme file and any other files that the current theme may have opened (such as a preferences file). When the appearance management layer executes code in the theme, the theme's resource chain is setup by the appearance management layer, which allows for normal GetResource calls to be used to get theme resources. If an application wishes to gain access to the current theme's resources, several functions can be provided. For example, to get a resource from the current theme file, a get theme resource function can be called, for example:

Handle GetThemeResource (OSType restype, UIntl6 id)

GetThemeResource has the same function as the GetResource function, except that this command gets the resource from the current theme's resource chain.

If more flexibility is needed when getting resources from the current theme file, the low-level appearance management layer function GetThemeTopMapHandle may be used to get the top of the current theme's resource chain.

OSErr GetThemeTopMapHandle (Handle *themeMap)

The GetThemeTopMapHandle function returns the top map handle that contains the current theme file and any other opened theme files (such as a preferences file) and all of the system resource maps. Caution should be exercised when using the GetThemeTopMapHandle function to avoid leaving the theme's resource chain switched in when executing utility functions or after returning to other parts of an application's code. When the theme's resource chain is switched in, the application's resource chain is unavailable. Note also that when the theme changes, this map handle and associated resources will no longer be valid, so this value should not be cached.

A theme can implement three theme definition functions that the appearance management layer calls when a theme is being loaded or disposed of. When the appearance management layer begins to switch to a theme, immediately following that theme's resource file being opened, the theme's function can be called.

pascal OSErr ThemeFilePreflight (void *themedata)

The theme's test function is called before any resources are loaded by the appearance management layer. In this way, the theme has an opportunity too test the conditions of the operating system (such as memory or graphics capability). If the test function returns an error, the appearance management layer will close the theme file and not attempt to continue loading. If the test function returns no error, the appearance management layer continues to load the theme, as described above.

The themedata parameter returned by the exemplary test function shown above is used by the theme to allocate and store any global data that the theme wishes to keep for itself. On entry to the test functions, the themedata parameter points to NIL. The test function (or any of the other theme definition functions) may change the value pointed to by themedata. This themedata value is persistent as long as the theme remains loaded.

When the appearance management layer is finished loading all of the theme's resources and loading each of the theme's standard definition procedures, the theme's initialize function is called, for example:

pascal OSErr ThemeFileInitialize (void *themedata)

The theme's initialize function can be used to do any special processing after the appearance management layer has completely loaded the theme. It may allocate data structures, load additional resources, open preferences files, setup its theme property list, etc. The themedata parameter points to a global storage location useful for storing a pointer to the themes global data. If the theme's initialize function returns an error, the appearance management layer will abort the switch to the theme. The appearance management layer will dispose of any allocations it has already made and close the theme file.

When the appearance management layer is preparing to unload a theme, the theme's dispose function is called, for example:

pascal OSErr ThemeFileDispose (void *themedata)

The dispose function should dispose of any allocations that were made with either the test or initialize functions. The theme file then has an opportunity to store any resources in its preferences file and/or set its theme properties. After the theme returns from this function, the appearance management layer will deallocate all of the appearance management layer's storage for the theme and close the theme's file.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

What is claimed is:

1. A computer readable medium comprising:
   a first portion having stored therein data relating to a first set of graphical user interface objects whose individual appearances are collectively associated with a first common theme;
   a second portion having stored therein data relating to a second set of graphical user interface objects each of which have the same function as an associated interface object in said first set, but whose individual appearances are collectively associated with a second common theme; and
   a third portion having stored therein computer executable code wherein, upon execution of instructions embedded in said code by a computer, a user interface associated with the computer selectively displays one of said first and second sets of graphical user interface objects.

2. The computer readable medium of claim 1, wherein said executable code further comprises instructions for enabling the user interface to switch from displaying one set of interface objects to another set of interface objects.

3. The computer readable medium of claim 1, wherein said sets of user interface objects include data related to patterns and colors used to create interface objects.

4. The computer readable medium of claim 3, wherein said data is contained within indexed entries of a pattern look-up table.

5. A computer readable medium encoded with a drawing resource that can be used to draw an object on a user interface, said layout resource comprising a plurality of data structures comprising:

a first set of graphical interface objects whose individual appearances are associated with a first common theme; and a second set of graphical user interface objects each of which have the same function as an associated interface object in said first set, but whose individual appearances are associated with a second common theme.

6. The computer readable medium of claim 5, wherein said sets of user interface objects include data related to patterns and colors used to create interface objects.

7. The computer readable medium of claim 6 further comprising executable code for instructing said drawing resource to draw the interface object according to one of said themes.

8. The computer readable medium of claim 7, where in said code instructs said drawing resource to switch the display from one of said themes to another of said themes.

9. A computer system comprising:

a storage means for storing data relating to first and second sets of graphical user interface objects;

a user interface for selectively displaying one of said sets of graphical user interface objects; and a control means for switching the display from one set of graphical interface objects to another set of graphical interface objects, wherein individual appearances of the first set of graphical interface objects are collectively associated with a first common theme and each of the second set of graphical interface objects having the same function as an associated interface object in said first set, but whose individual appearances are collectively associated with a second common theme.

10. The computer system of claim 9, wherein said sets of user interface objects include data related to patterns and colors used to create interface objects.

11. The computer system of claim 10, wherein said storage means further stores a pattern look-up table with indexed entries containing data related to patterns and colors used to create the interface objects.

12. A computer system comprising:

a storage means for storing data relating to first and second sets of graphical user interface objects;

a graphical user interface for selectively displaying one of said sets of graphical user interface objects; and a selection means for switching the display from one set of interface objects to another set of interface objects, whereby the user interface displays interface objects using one of the sets of graphical user interface objects, said selection means including:

a control layer having a pattern look-up table with indexed entries containing data related to patterns and colors used to create interface objects; and a command means for commanding the control layer to draw a pattern on the interface referring to at least one of the indexed entries in the pattern look-up table, wherein individual appearances of the first set of graphical interface objects are collectively associated with a first common theme and each of the second set of graphical interface objects having the same function as an associated interface object in said first set, but whose individual appearances are collectively associated with a second common theme.

13. The computer system of claim 12, further comprising:

a mapping means for mapping at least one of the indexed entries in said look-up table into a table of drawing procedures to identify at least one mapped drawing procedure; and means for invoking said at least one mapped drawing procedure which translates said command to draw a pattern on said interface into a command for a graphic subsystem using data from said pattern look-up table.

14. The computer system of claim 13, wherein said mapping means further comprises:

a part index table which includes indices and mapping values.

15. The computer system of claim 12, further comprising:

an input means for enabling a user to communicate with the graphical user interface whereby said user sends commands for drawing objects on said interface, wherein said commands include command indices which correspond to indexed entries in the pattern look-up table.

* * * * *

Disclaimer

6,239,795—Robert R. Ulrich, Mountain View; Robert G. Johnston, Jr., Cupertino, both of CA (US). PATTERN AND COLOR ABSTRACTION IN A GRAPHICAL USER INTERFACE. Patent dated May 29, 2001. Disclaimer filed October 13, 2000 by Assignee, Apple Computer, Inc.

The term of this patent shall not extend beyond the expiration date of Patent No. 5,963,206.

*(Official Gazette, July 20, 2010)*

(12) EX PARTE REEXAMINATION CERTIFICATE (8870th)
United States Patent
Ulrich et al.

(10) Number: US 6,239,795 C1
(45) Certificate Issued: Feb. 28, 2012

(54) PATTERN AND COLOR ABSTRACTION IN A GRAPHICAL USER INTERFACE

(75) Inventors: Robert R. Ulrich, Mountain View, CA (US); Robert G. Johnston, Jr., Cupertino, CA (US)

(73) Assignee: Apple Inc., Cupertino, CA (US)

Reexamination Request:
No. 90/010,966, Jun. 2, 2010

Reexamination Certificate for:
Patent No.: 6,239,795
Issued: May 29, 2001
Appl. No.: 09/320,947
Filed: May 26, 1999

Related U.S. Application Data

(63) Continuation of application No. 08/797,451, filed on Feb. 7, 1997, now Pat. No. 5,963,206, which is a continuation of application No. 08/242,963, filed on May 16, 1994, now abandoned.

(51) Int. Cl.
*G06F 3/00* (2006.01)

(52) U.S. Cl. .......................................... 715/866
(58) Field of Classification Search .................. None
See application file for complete search history.

(56) References Cited

To view the complete listing of prior art documents cited during the proceeding for Reexamination Control Number 90/010,966, please refer to the USPTO's public Patent Application Information Retrieval (PAIR) system under the Display References tab.

*Primary Examiner* — Salman Ahmed

(57) ABSTRACT

Systems and method for providing a user with increased flexibility and control over the appearance and behavior of objects on a user interface. Sets of objects can be grouped into themes to provide a user with a distinct overall impression of the interface. Themes can be switched dynamically by switching pointers to drawing procedures or switching data being applied to these procedures. To buffer applications from the switchable nature of graphical user interfaces, colors and patterns used to implement the interface objects are abstracted from the interface by, for example, pattern look-up tables.

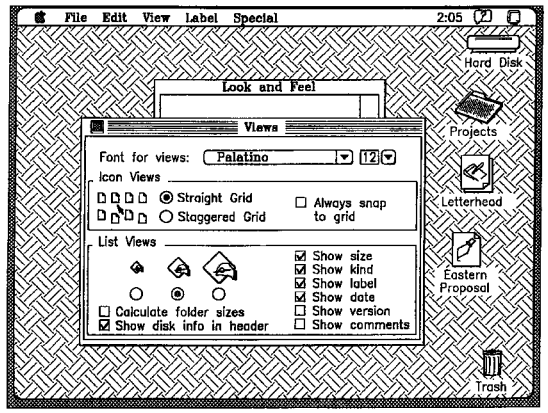
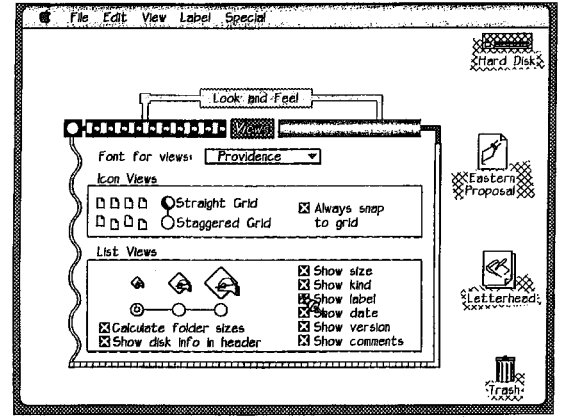

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

Claims 13-15 were not reexamined.

* * * * *